US009310204B2

(12) United States Patent
McGregor et al.

(10) Patent No.: US 9,310,204 B2
(45) Date of Patent: Apr. 12, 2016

(54) ROUTE MODELER FOR IMPROVING DESIRED ENVIRONMENTAL AND ECONOMIC FLIGHT CHARACTERISTICS

(71) Applicant: The Boeing Company, Chicago, IL (US)

(72) Inventors: Daniel Lee McGregor, Renton, WA (US); Abigail Maxine Diocares, Mill Creek, WA (US); Paul Henry Bent, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 257 days.

(21) Appl. No.: 13/758,228

(22) Filed: Feb. 4, 2013

(65) Prior Publication Data
US 2014/0222337 A1  Aug. 7, 2014

(51) Int. Cl.
G01C 21/34 (2006.01)
G01C 21/00 (2006.01)
G06Q 10/06 (2012.01)
G06F 19/00 (2011.01)
G06G 7/70 (2006.01)
G06G 7/76 (2006.01)
G06Q 20/00 (2012.01)
G06Q 10/00 (2012.01)

(52) U.S. Cl.
CPC ............ G01C 21/00 (2013.01); G06Q 10/0631 (2013.01)

(58) Field of Classification Search
CPC ...................................................... G01C 21/00
USPC ............. 701/120, 439, 528; 705/7.13, 1.1, 30
See application file for complete search history.

(56) References Cited

U.S. PATENT DOCUMENTS

| | | | |
|---|---|---|---|
| 6,314,362 B1 * | 11/2001 | Erzberger et al. | 701/120 |
| 6,381,538 B1 * | 4/2002 | Robinson et al. | 701/439 |
| 2006/0122918 A1 * | 6/2006 | Graboske et al. | 705/30 |
| 2011/0282679 A1 * | 11/2011 | Wenzlau et al. | 705/1.1 |
| 2012/0022904 A1 * | 1/2012 | Mason et al. | 705/7.13 |
| 2012/0150426 A1 * | 6/2012 | Conway | 701/120 |

OTHER PUBLICATIONS

Clark et al., "En Route Traffic Optimization to Reduce Environmental Impact," Report No. Partner-COE-2008-001, Jul. 2008, 57 pages.
(Continued)

Primary Examiner — Helal A Algahaim
Assistant Examiner — Mahmoud Ismail
(74) Attorney, Agent, or Firm — Yee & Associates, P.C.

(57) ABSTRACT

A method and apparatus for processing routes is disclosed. An area of interest associated with a number of routes for a number of aircraft and an identification of a number of weightings for a number of characteristics for the number of routes are identified. The number of characteristics includes at least one of a number of environmental characteristics or a number of economic characteristics. A number of new routes are generated based on information about the number of routes associated with the area of interest. Values are identified for characteristics in the number of characteristics for each new route in the number of new routes and for each route in the number of routes based on the information. A performance value is identified for the each new route and for the each route based on the values and the number of weightings for the number of characteristics.

26 Claims, 18 Drawing Sheets

(56) References Cited

OTHER PUBLICATIONS

Clarke et al., "Final Findings on the Development and Evaluation of an En-Route Fuel Optimal Conflict Resolution Algorithm to Support Strategic Decision-Making," Report No. Partner-COE-2012-001, Jan. 2012, 61 pages.

Kreshover et al., "Integrated Noise Model Route Optimization for Aircraft," 2000 Systems Engineering Capstone Conference, University of Virginia, Aug. 2000, pp. 31-34.

Bower et al., "Multi-Objective Aircraft Optimization for Minimum Cost and Emissions Over Specific Route Networks," 26th International Congress of the Aeronautical Sciences, Sep. 2008, 23 pages.

"Project 5; En Route Traffic Optimization to Reduce Environmental Impace (Project Completed)," Project, Massachusetts Institute of Technology, 2013, 2 pages, accessed Feb. 4, 2013 mit.edu/aeroastro/partner/projects/project5.html.

European Patent Office Communication, dated Jan. 4, 2016, regarding Application No. 14153549.2, 8 pages.

* cited by examiner

FIG. 15
| MEASURED POPULATION | NORMALIZATION FACTOR |
|---|---|
| 10 | 20 |
| 100 | 40 |
| 1,000 | 60 |
| 10,000 | 80 |
| 100,000 | 100 |
| 1,000,000 | 120 |
| 10,000,000 | 140 |
1500
1502
1504
FIG. 16
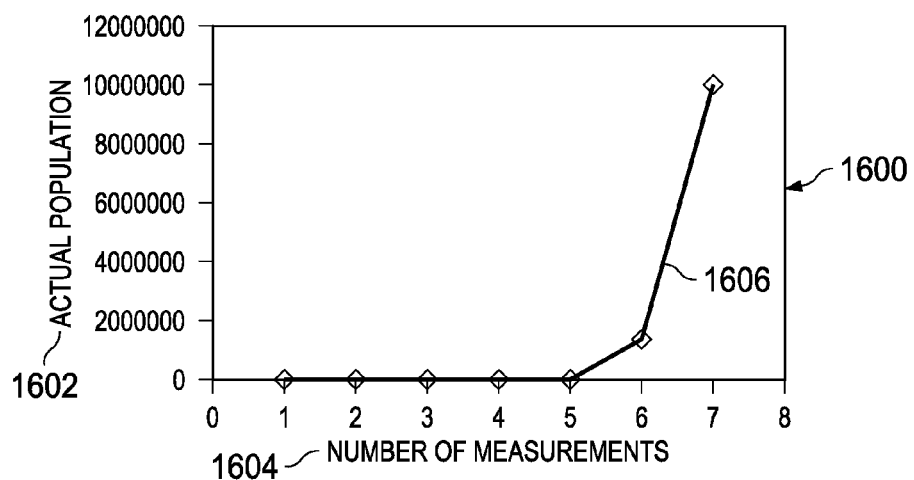
FIG. 17
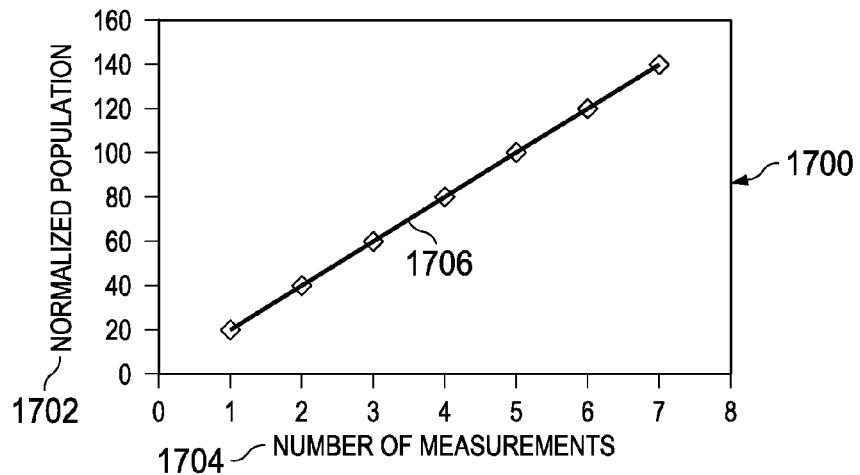

FIG. 19

| FLIGHT EFFICIENCY DATA FOR BASELINE AND FIRST PROPOSED ARRIVAL TRACK | POPULATION EXPOSED TO AIRCRAFT NOISE | NORMALIZED POPULATION EXPOSED TO NOISE | FLIGHT TRACK DISTANCE (nmi) | FLIGHT TRACK DISTANCE DIFFERENCE (nmi) | FUEL BURN (lbs) | FUEL BURN DIFFERENCE (lbs) |
|---|---|---|---|---|---|---|
| BASELINE ARRIVAL FLIGHT TRACK | 100,000 | 100.0000 | 44.0 | N/A | 648.0 | N/A |
| FIRST PROPOSED ARRIVAL (OPTIMIZED LATERAL TRACK) | 103,000 | 100.2567 | 42.5 | -1.5 | 628.0 | -20.0 |

FIG. 20

| APPLICATION OF ENVIRONMENTAL WEIGHTING FACTORS | DELTA NORMALIZED POPULATION | POPULATION WEIGHTING FACTOR (PWF) | DELTA FLIGHT TRACK DISTANCE (nmi) | DISTANCE WEIGHTING FACTOR (DWF) | DELTA FUEL BURN (lbs) | FUEL WEIGHTING FACTOR (FWF) |
|---|---|---|---|---|---|---|
| DIFFERENCE BETWEEN BASELINE AND FIRST PROPOSED ARRIVAL TRACK | .2567 | 10.0 | -1.5 | 2.0 | -20.0 | 2.0 |

| ENVIRONMENTAL FLIGHT EFFICIENCY METRIC CALCULATION | DELTA NORMALIZED POPULATION *PWF | DELTA FLIGHT TRACK DISTANCE *DWF | DELTA FUEL BURN *FWF | ENVIRONMENTAL FLIGHT EFFICIENCY METRIC FOR THE FIRST PROPOSED ARRIVAL FLIGHT PROCEDURE -SHORTENED FLIGHT TRACK (EFFICIENCY UNITS) |
|---|---|---|---|---|
| FLIGHT EFFICIENCY COEFFICIENT FOR THE FIRST PROPOSED ARRIVAL FLIGHT PROCEDURE | 25.67 | -3.0 | -40.0 | -17.33 |

2100

| FLIGHT EFFICIENCY DATA FOR BASELINE AND SECOND OPTIMIZED TRACK | POPULATION EXPOSED TO AIRCRAFT NOISE | NORMALIZED POPULATION EXPOSED TO NOISE | FLIGHT TRACK DISTANCE (nmi) | FLIGHT TRACK DISTANCE DIFFERENCE (nmi) | FUEL BURN (lbs) | FUEL BURN DIFFERENCE (lbs) |
|---|---|---|---|---|---|---|
| BASELINE ARRIVAL FLIGHT TRACK | 100,000 | 100.0 | 40.0 | N/A | 524.0 | N/A |
| SECOND PROPOSED ARRIVAL (OPTIMIZED LATERAL TRACK) | 100,000 | 100.0 | 40.0 | 0.0 | 381.0 | -143.0 |

| APPLICATION OF ENVIRONMENTAL WEIGHTING FACTORS | DELTA NORMALIZED POPULATION | POPULATION WEIGHTING FACTOR (PWF) | DELTA FLIGHT TRACK DISTANCE (nmi) | DISTANCE WEIGHTING FACTOR (DWF) | DELTA FUEL BURN (lbs) | FUEL WEIGHTING FACTOR (FWF) |
|---|---|---|---|---|---|---|
| DIFFERENCE BETWEEN BASELINE AND SECOND PROPOSED ARRIVAL TRACK | 0.0 | 10.0 | 0.0 | 2.0 | -143.0 | 2.0 |

| ENVIRONMENTAL FLIGHT EFFICIENCY METRIC CALCULATION | DELTA NORMALIZED POPULATION *PWF | DELTA FLIGHT TRACK DISTANCE *DWF | DELTA FUEL BURN *FWF | ENVIRONMENTAL FLIGHT EFFICIENCY METRIC FOR THE SECOND PROPOSED ARRIVAL FLIGHT PROCEDURE -OPTIMIZED VERTICAL PROFILE (EFFICIENCY UNITS) |
|---|---|---|---|---|
| FLIGHT EFFICIENCY COEFFICIENT FOR THE SECOND PROPOSED ARRIVAL FLIGHT PROCEDURE | 0.0 | 0.0 | -286.0 | -286.0 |

FIG. 27

ROUTE MODELER FOR IMPROVING DESIRED ENVIRONMENTAL AND ECONOMIC FLIGHT CHARACTERISTICS

BACKGROUND INFORMATION

1. Field

The present disclosure relates generally to aircraft and, in particular, to routes for aircraft. Still more particularly, the present disclosure relates to a method and apparatus for analyzing the efficiency of routes for aircraft and environmental considerations of aircraft along the routes.

2. Background

Commercial aircraft fly on routes from an originating airport to a destination airport. These routes are often pre-planned. These routes may result in an aircraft flying over cities, other populated areas, and unpopulated areas. A route for an aircraft may include both lateral and vertical parts. For example, a route may include a number of changes for an aircraft to take, such as turning, climbing, descending, and holding elevation at different times and locations along the route. These changes may be desired for different reasons. For example, changes in lateral or vertical parts of a route may be desired for air traffic considerations, to avoid particular terrain, to avoid weather conditions, or for other suitable types of reasons.

In planning routes, improving results for economic characteristics may be desired. For example, routes for particular aircraft may be selected such that a desired amount of fuel burn may be achieved. In other examples, a route for an aircraft may be selected based on a desired time of flight. In other words, a desired route for an aircraft may take into account fuel burn, flight time, and other suitable economic characteristics when the route is selected.

A desired route may also be selected based on environmental characteristics. For example, routes for particular aircraft may be selected to reduce emissions. These emissions may be, for example, in the form of noise, carbon dioxide, and other types of emissions.

Aircraft routes may affect people, businesses, and organizations. For example, individuals, groups of individuals, airlines, government agencies, airports, and environmental studies may be affected by the selection of routes for particular aircraft over an area of land.

Further, when considering the environmental characteristics and/or economic characteristics of routes over an area of land, there may be many different opinions regarding how to select routes for aircraft over the area of interest. Therefore, it would be desirable to have a method and apparatus that takes into account at least some of the considerations discussed above, as well as other possible considerations.

SUMMARY

In one illustrative embodiment, an apparatus for processing routes is disclosed. A route modeler of an apparatus is configured to identify an area of interest associated with a number of routes for a number of aircraft and an identification of a number of weightings for a number of characteristics for the number of routes for the number of aircraft. The number of characteristics includes at least one of a number of environmental characteristics or a number of economic characteristics. The route modeler is also configured to generate a number of new routes for the number of aircraft for the area of interest based on information about the number of routes associated with the area of interest. The route modeler is further configured to identify values for characteristics in the number of characteristics for each new route in the number of new routes and for each route in the number of routes based on the information. The route modeler is configured to then identify a performance value for the each new route in the number of new routes and for the each route in the number of routes based on the values and the number of weightings for the number of characteristics.

In another illustrative embodiment, an apparatus comprises a route modeler. The route modeler is configured to identify first information for a performance of an aircraft for a selected route over an area of interest; identify second information for the performance of the aircraft for a new route; identify a first number of values for a number of characteristics about the selected route based on the first information; and identify a second number of values for the number of characteristics about the new route based on the second information. The route modeler is further configured to adjust the first number of values for the number of characteristics based on a number of weightings for an entity for each characteristic and adjust the second number of values for the number of characteristics based on the number of weightings for the entity for each characteristic. The route modeler is then further configured to select a desired route based on the first number of values for the number of characteristics and the second number of values for the number of characteristics.

In yet another illustrative embodiment, a method for processing routes is presented. An area of interest associated with a number of routes for a number of aircraft and an identification of a number of weightings for a number of characteristics for the number of routes for the number of aircraft are identified. The number of characteristics includes at least one of a number of environmental characteristics or a number of economic characteristics. A number of new routes are generated for the number of aircraft for the area of interest based on information about the number of routes associated with the area of interest. Values are identified for characteristics in the number of characteristics for each new route in the number of new routes and for each route in the number of routes based on the information. A performance value is identified for the each new route and for the each route based on the values and the number of weightings for the number of characteristics.

In still another illustrative embodiment, an apparatus comprises a route modeler. The route modeler is configured to identify an area of interest associated with a number of routes for a number of aircraft and an identification of a number of weightings for a number of characteristics for the number of routes for the number of aircraft. The route modeler is further configured to identify performance values representing a performance of the number of aircraft on the number of routes taking into account weightings for the number of characteristics.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is an illustration of a table of normalization factors for population densities in accordance with an illustrative embodiment;

FIG. 16 is an illustration of a graph of population density for a number of measurements in accordance with an illustrative embodiment;

FIG. 17 is an illustration of a graph of population density after a process of normalization in accordance with an illustrative embodiment;

FIG. 19 is an illustration of a table of values for characteristics for a proposed route and an existing route in accordance with an illustrative embodiment;

FIG. 20 is an illustration of a table of values for differences in characteristics between an existing route and a proposed route in accordance with an illustrative embodiment;

FIG. 25 is an illustration of a table of values for characteristics for a proposed route and an existing route in accordance with an illustrative embodiment;

FIG. 26 is an illustration of a table of values for differences in characteristics between an existing route and a proposed route in accordance with an illustrative embodiment;

FIG. 27 is an illustration of a table of the values for differences in characteristics between an existing route and a proposed route in which weightings have been applied in accordance with an illustrative embodiment.

DETAILED DESCRIPTION

Figure 1:
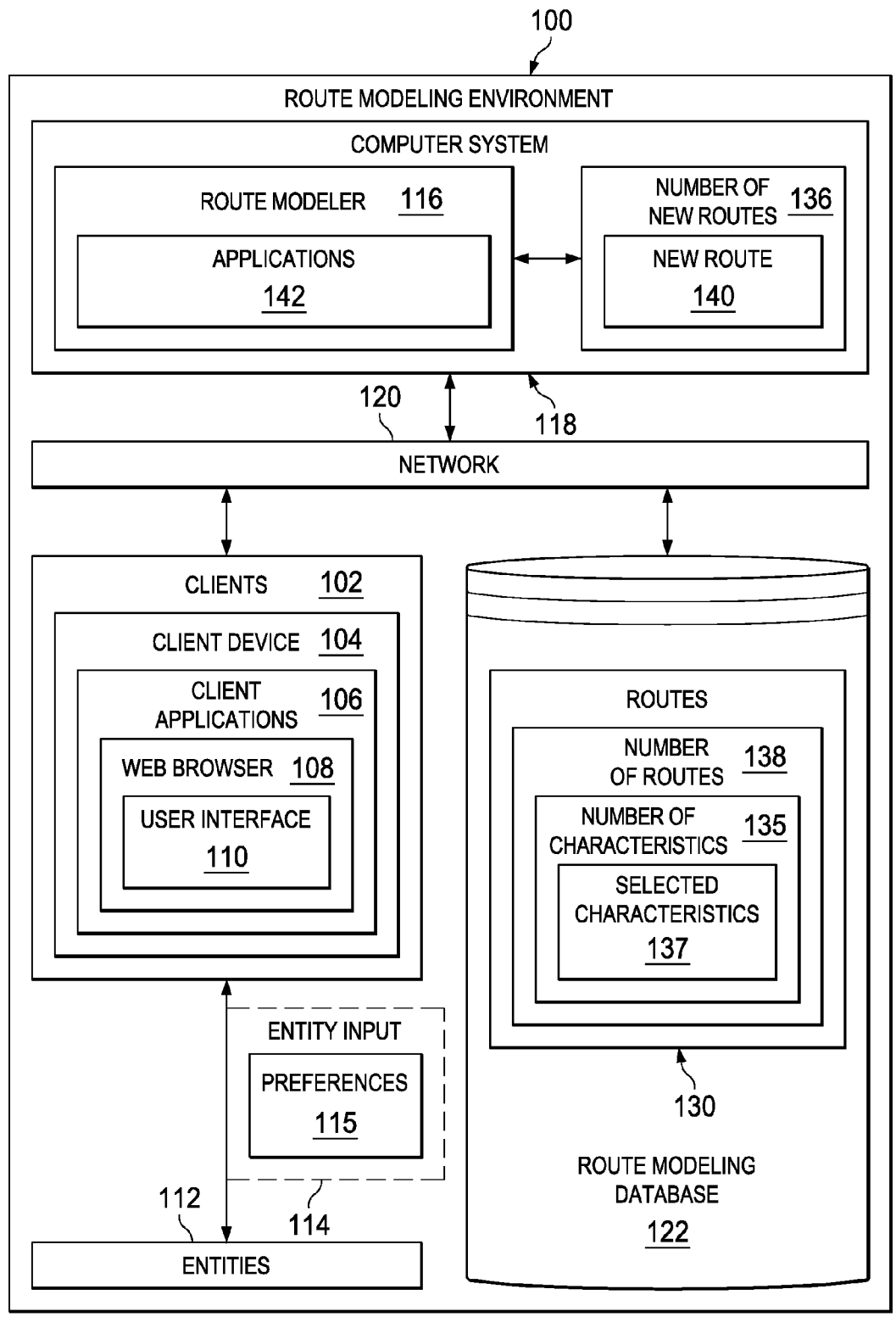
FIG. 1 is an illustration of a block diagram of a route modeling environment for processing routes for aircraft in which an illustrative embodiment may be implemented.

The illustrative embodiments recognize and take into account a number of different considerations. For example, the illustrative embodiments recognize and take into account that it may be desirable to modify a commercial aircraft route for environmental considerations. For instance, a reduction in carbon dioxide emissions, materials used, noise, and other suitable environmental characteristics of an aircraft traveling along a route may be desired. Further, Federal Aviation Administration regulations, airport procedures, and other guidelines for aircraft may necessitate a route modification. For example, to comply with these rules, an aircraft flying over an area of interest may need to limit emissions or noise while traveling within that area.

The illustrative embodiments also recognize and take into account that efficiency of aircraft along a route is desirable to reduce the operating costs of the aircraft. For example, a reduction in fuel use, flight time, and other suitable aircraft characteristics may decrease the operating cost of the aircraft. Further, improving passenger comfort by reducing cabin noise and other passenger-related characteristics may increase passenger satisfaction with the carrier.

Further, the illustrative embodiments recognize and take into account that some currently used systems may not quantify the environmental considerations of selected routes based on desired combinations of environmental characteristics and economic characteristics of selected routes by particular entities. These environmental characteristics and economic characteristics may be viewed differently by different types of entities. For instance, different entities may have different priorities for the environmental characteristics and/or economic characteristics. Moreover, some currently used systems may not generate and prioritize routes based on the type of aircraft used.

Additionally, the illustrative embodiments recognize and take into account that new routes may be generated based on combinations of these environmental characteristics and/or economic characteristics. However, some currently used systems may not process routes for aircraft by generating new routes and prioritizing the new routes based on a preference for characteristics of particular entities. For example, some currently used systems may not take into account product development, fleet management and acquisition, airport and/or community planning, air traffic planning, systems design, regulatory considerations, and other characteristics of particular entities.

Thus, the illustrative embodiments provide a method and apparatus for processing routes. An apparatus comprises a route modeler configured to identify an area of interest associated with a number of routes for a number of aircraft. As used herein, "a number of" when used with reference to items means one or more items. For example, a number of routes is one or more routes.

The route modeler is further configured to provide an identification of a number of weightings for a number of characteristics for the number of routes for the number of aircraft. As used herein, "a group of" when used with reference to items means one or more items. For example, a number of weightings is one or more weightings.

The number of characteristics includes at least one of a number of environmental characteristics or a number of economic characteristics. The route modeler is further configured to generate a number of new routes for the number of aircraft for the area of interest based on information about the number of routes associated with the area of interest. The route modeler is still further configured to identify values for characteristics in the number of characteristics for each new route in the number of new routes and for each route in the number of routes based on the information. Additionally, the route modeler is configured to identify a performance value for the each new route in the number of new routes and for the each route in the number of routes based on the values and the number of weightings for the number of characteristics.

With reference now to the figures and, in particular, with reference to FIG. 1, an illustration of a block diagram of a route modeling environment for processing routes for aircraft is depicted in accordance with an illustrative embodiment. In this illustrative example, route modeling environment 100 includes clients 102, entities 112, computer system 118, network 120, and route modeling database 122.

In this depicted example, clients 102 are present in route modeling environment 100. Clients 102 are hardware devices in these illustrative examples. Client applications 106 run on clients 102. In particular, client applications 106 may run on client device 104 in clients 102.

Client device 104 in clients 102 may be, for example, without limitation, a tablet computer, a laptop computer, a mobile phone, a desktop computer, a workstation, or other suitable types of devices in these illustrative examples. Other clients in clients 102 may be the same type of device as client device 104 or different types of devices, depending on the particular implementation.

As used herein, the phrase "at least one of," when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. In other examples, "at least one of" may be, for example, without limitation, two of item A, one of item B, and ten of item C; four of item B and seven of item C; and other suitable combinations. The item may be a particular object, thing, or a category. In other words, at least one of means any combination items and number of items may be used from the list but not all of the items in the list are required.

In this illustrative example, client applications 106 include web browser 108. In other illustrative examples, client applications 106 also may include at least one of a planning application, a database application, a smart-phone application, or other suitable types of applications in addition to or in place of web browser 108.

In these depicted examples, web browser 108 may display information on a display screen and may also present information by using a speaker to emit audio. For example, client applications 106 may display user interface 110 to operators of clients 102 using web browser 108.

Further, user interface 110 in web browser 108 may be used to receive input from one of entities 112. As an example, an entity in entities 112 may use web browser 108 running on client device 104 to provide entity input 114 to route modeler 116 in computer system 118. Entity input 114 is input that provides information used to analyze a route, make changes to a route, or some combination thereof for improving characteristics of a route for an aircraft. In this illustrative example, entity input 114 may comprise preferences 115 for characteristics of routes 130 stored in route modeling database 122.

As used herein, a "route" is a path for an aircraft. For example, a route may include a number of changes for an aircraft to take, such as turning, climbing, descending, and holding elevation at different times and locations along the route. A route in routes 130 may be described using three-dimensional points in space, such as waypoints. In still other illustrative examples, the route in routes 130 may be described using vectors. In this example, routes 130 are predetermined routes. In other words, routes 130 are routes stored in route modeling database 122 prior to processing by route modeler 116.

In the different illustrative examples, an entity in entities 112 may be, for example, without limitation, an individual, a group of individuals, an airline, a government agency, an airport, an environmental study, a regulatory agency, a product development team, an avionics development team, an air traffic manager, a pilot, an educational facility, or another suitable individual, group, or agency associated with an area of land. For example, any combination of different types of entities 112 may live, work, and visit the area of land.

As another example, an entity in entities 112 may have a concern in the area of land, such as having responsibility for governing and managing the area of land. In yet another example, an entity may operate aircraft that fly over the area of land.

As depicted, client applications 106 in client device 104 communicate with route modeler 116 in computer system 118. In this illustrative example, client applications 106 communicate with route modeler 116 using network 120 in these illustrative examples. Further, route modeler 116 in computer system 118 and client applications 106 in client device 104 may communicate with route modeling database 122 over network 120.

In these illustrative examples, route modeler 116 is configured to process routes 130 in route modeling database 122. Route modeler 116 may be implemented in software, hardware, firmware, or a combination thereof. When software is used, the operations performed by route modeler 116 may be implemented in program code configured to run on a processor unit. When firmware is used, the operations performed by route modeler 116 may be implemented in program code and data and stored in persistent memory to run on a processor unit. When hardware is employed, the hardware may include circuits that operate to perform the operations in route modeler 116.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Route modeler 116 is implemented in computer system 118 in this illustrative example. Computer system 118 is one or more computers. If more than one computer is present, those computers may communicate with each other over a medium, such as network 120.

As depicted, route modeler 116 uses entity input 114 to process routes 130 stored in route modeling database 122. For example, route modeler 116 may process requests from entities 112 based on entity input 114 for one or more routes 130. In this example, entity input 114 specifies a request to process number of routes 138 in routes 130.

Route modeler 116 may then process number of routes 138 for aircraft based on entity input 114 sent from client device 104 over network 120. In this instance, number of routes 138 may be retrieved from route modeling database 122.

Additionally, route modeler 116 is configured to process number of routes 138 for a number of aircraft in these illustrative examples. The number of aircraft may be the same type of aircraft or a different type of aircraft in these illustrative examples. In other words, number of routes 138 may be routes for one aircraft, a route for multiple aircraft, routes for multiple aircraft, or some other suitable combination of routes and aircraft.

As depicted, the processing of number of routes 138 by route modeler 116 may include, for example, without limitation, generating number of new routes 136, analyzing characteristics of number of routes 138 or number of new routes 136, and identifying an efficiency of number of routes 138 or number of new routes 136. For instance, route modeler 116 may be used to analyze number of characteristics 135 of number of routes 138. As another example, route modeler 116 may be used to improve selected characteristics 137 of a route in number of routes 138 by identifying new route 140 in number of new routes 136 having selected characteristics 137.

In these illustrative examples, selected characteristics 137 may be characteristics selected by entities 112 through entity input 114. Selected characteristics 137 may include one or more characteristics to modify a route for one or more purposes desired by entities 112.

When route modeler 116 includes software, the software may take the form of applications 142. Applications 142 are configured to provide services by processing routes 130 for aircraft. Applications 142 may be, for example, at least one of a database server, a file transfer protocol (FTP) server, a web server, a request processor, a results generator, a route generator, a simulator of characteristics for aircraft on routes, or other suitable types of applications. The services provided by applications 142 include, for example, at least one of retrieving a file, retrieving a webpage, retrieving information, writing information, downloading a program, processing requests, generating requests, or other suitable types of access.

The illustration of route modeling environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional computer systems, in addition to computer system 118, may be present within route modeling environment 100. As another example, a plurality of servers, including but not limited to web servers, application servers, and other suitable servers for processing routes 130 may be present in route modeling environment 100. In this example, each of the plurality of servers may be used by route modeler 116 to generate and send user interface 110 to client device 104.

Also, although route modeler 116 is shown as a block in computer system 118, route modeler 116 may be implemented in one or more other computer systems in addition to computer system 118. In other examples, route modeler 116 may be implemented in a cluster of computer systems in route modeling environment 100. For instance, route modeler 116 may be implemented in a first computer that is sending results for requests to client device 104, in another computer that is receiving entity input 114 from client device 104, and a third computer that is processing routes 130.

Further, components in route modeling environment 100, such as computer system 118, clients 102, and route modeling database 122, may be remote from each other. As an example, the components in route modeling environment 100 may be located in different physical locations. For instance, route modeler 116 may be located in a first physical location and route modeling database 122 may be located in a second physical location different from the first physical location.

Figure 2:
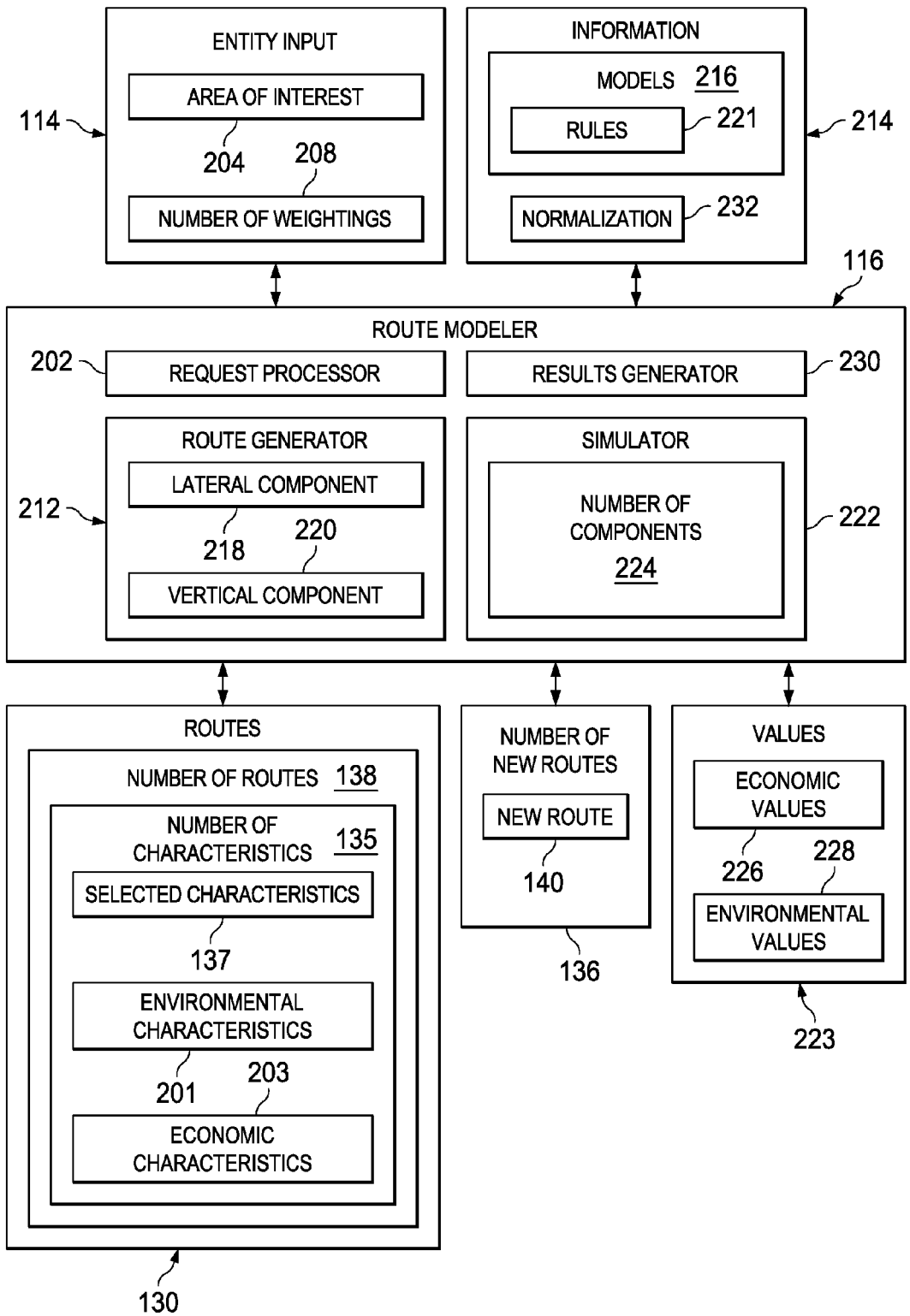
FIG. 2 is an illustration of a block diagram of components of a route modeler involved in processing routes for aircraft in accordance with an illustrative embodiment.

Turning next to FIG. 2, an illustration of a block diagram of components of a route modeler involved in processing routes for aircraft is depicted in accordance with an illustrative embodiment. As depicted, an example of one implementation for route modeler 116 is shown.

In this illustrative example, route modeler 116 includes a number of different components. As depicted, route modeler 116 includes request processor 202, route generator 212, results generator 230, and simulator 222.

Request processor 202 receives entity input 114 for processing routes. In this illustrative example, entity input 114 includes number of weightings 208. In this example, number of weightings 208 is for selected characteristics 137 in number of characteristics 135. As depicted, number of characteristics 135 may include at least one of environmental characteristics 201, economic characteristics 203, or other suitable types of characteristics.

A characteristic in number of characteristics 135 for a route in number of routes 138 is an effect of the route. In particular, the effect is one based on an aircraft traveling along the route. This effect may be, for example, environmental, economical, or some other suitable consideration. In other words, characteristics in number of characteristics 135 may be environmental characteristics or economic characteristics. For example, without limitation, environmental characteristics may be selected from at least one of an amount of fuel used, an amount of noise produced, a count of population affected, an amount of impact to local air quality of an area of interest, airport environmental regulations, emissions levels, or other suitable environmental characteristics. Economic characteristics may be selected from, for example, without limitation, cabin noise, airspace capacity, impacts of airport environmental regulations and associated fees, duration of time taken by aircraft along the route, route distance, and other suitable economic characteristics.

In theses illustrative examples, an environmental characteristic for a route is a type of characteristic having an environmental effect of aircraft along the route. An economic characteristic is a type of characteristic for a route having an economic effect of aircraft along the route. In these illustrative examples, selected characteristics 137 may include one or more environmental characteristics 201 and economic characteristics 203. In other words, selected characteristics 137 identified by entity input 114 may include environmental characteristics 201, economic characteristics 203, or a combination thereof.

As depicted, selected characteristics 137 in number of characteristics 135 have number of weightings 208. As used herein, a weighting is a value used to adjust a characteristic. For example, number of weightings 208 for selected characteristics 137 may be a number within a range of values on a scale. For example, a weighting in number of weightings 208 may be a number between 1 and 10. The weighting may also be based on another type of scale such as a percentage between 0 and 100, a numeric range between 1 and 4, real numbers between 0 and 1, a choice between high, medium, and low, and other suitable types of scale for identifying importance of one characteristic over another characteristic.

In the illustrative examples, the values for weightings 208 may be used to emphasize or deemphasize the importance of a particular characteristic in selected characteristics 137. Thus, if a characteristic has a higher weighting, that characteristic may be considered to have a higher level of importance.

In these illustrative examples, area of interest 204 is an area of land. This area of land may be the land along the route between two waypoints, a terminal area, a take-off area, a taxiway, a landing area, the entire area along a route, a city, or any number of different areas.

Request processor 202 identifies number of routes 138 in routes 130 based on associations between number of routes 138 and area of interest 204. For example, number of routes 138 in routes 130 may be associated with area of interest 204 based on one of aircraft arriving at area of interest 204, aircraft departing from area of interest 204, aircraft flying over area of interest 204, and other suitable associations between number of routes 138 and area of interest 204. In this example, entity input 114 may further comprise an identification of selected characteristics 137 for use in processing number of routes 138.

As depicted, route generator 212 may be used in a process for generating number of new routes 136. In this illustrative example, route generator 212 may generate number of new routes 136 based on information 214.

In this depicted example, information 214 may include models 216. As used herein, a model is a description for use in identifying characteristics for performance of an aircraft. For example, route generator 212 may generate new route 140 in number of new routes 136 based on descriptions in models 216 for identifying number of characteristics 135 for performance of aircraft along number of routes 138 in models 216. Selected characteristics 137 may then be selected by entities 112 from number of characteristics 135 identified for performance of the aircraft along number of routes 138.

In these illustrative examples, route generator 212 includes lateral component 218 and vertical component 220. Lateral component 218 is configured to perform at least one of analyzing lateral parts of number of routes 138, generating lateral parts of number of new routes 136, or validating lateral parts of number of new routes 136. Lateral component 218 may generate the lateral parts of number of new routes 136 using a first number of rules in rules 221.

As depicted, vertical component 220 is configured to perform at least one of analyzing vertical parts of number of routes 138, generating vertical parts of number of new routes 136, or validating vertical parts of number of new routes 136. Vertical component 220 may generate the vertical parts of number of new routes 136 using a second number of rules in rules 221.

In these depicted examples, lateral component 218 and vertical component 220 may use information 214 in one or more processes for analyzing, generating, and validating routes. In these illustrative examples, validating number of routes 138 and number of new routes 136 may be based on rules 221 for validating routes. Rules 221 are defined in models 216 and may be associated with area of interest 204. For example, a rule in rules 221 that applies to one area of interest may not apply to another area of interest. Rules 221 may include one or more rules for improving at least one of an amount of fuel used, duration of flight, or any other suitable characteristics.

In this illustrative example, simulator 222 is a component in route modeler 116 configured to identify values 223 for number of characteristics 135 of number of routes 138 and number of new routes 136. For example, simulator 222 may identify values 223 for number of characteristics 135 of number of routes 138 and number of new routes 136 based on models 216.

As depicted, simulator 222 may comprise number of components 224 configured to identify values 223 for number of characteristics 135. For example, number of components 224 in simulator 222 may identify economic values 226 in values 223 for economic characteristics 203. Similarly, number of components 224 in simulator 222 may identify environmental values 228 in values 223 for environmental characteristics 201.

As another example, simulator 222 may identify values 223 based on existing flight data or by some combination of existing flight data and models 216. For example, routes 130 may be monitored for actual performance by aircraft. The results of this monitoring may be stored as flight data for subsequent use. In this example, flight data may be stored in route modeling database 122 in FIG. 1.

Results generator 230 adjusts values 223 for selected characteristics 137 in number of characteristics 135 based on number of weightings 208 for selected characteristics 137. The adjustment of values 223 for selected characteristics 137 may be used to increase an emphasis of the importance of selected characteristics 137.

For example, results generator 230 may increase one or more values in values 223 and decrease one or more other values in values 223 based on number of weightings 208. Results generator 230 may identify one or more weightings in number of weightings 208 for selected characteristics 137 in number of characteristics 135 that correspond to one more values in values 223.

In these illustrative examples, a weighting in number of weightings 208 corresponds to a value in values 223 when the weighting and the value are both for the same characteristic in selected characteristics 137. Of course, results generator 230 may increase or decrease values 223 for all of number of characteristics 135, selected characteristics 137, or based on other parameters, depending on the particular implementation.

As depicted, results generator 230 also adjusts values 223 based on normalization 232. In these illustrative examples, normalization 232 is one or more of a table of normalization factors for values 223 and formulas for normalizing values 223.

As used herein, normalization of values is a process for adjusting values for a number of characteristics to a range of values. As depicted, values 223 of number of characteristics 135 may be normalized for use in making comparisons between the values of different types of characteristics.

For example, a first value for a first characteristic may be identified for a first potential range of values between 0 and 1000. In this example, the first value may be adjusted upward by an order of magnitude to account for a second value for a second characteristic identified for another range of values between 0 and 10000. In this example, the first value for the first characteristic is normalized to the second value for the second characteristic by multiplying the first value by ten. Thus, having multiplied whatever the value is for the first characteristic by ten, the first value is now normalized with the second value.

Other types of normalization may also be used in these illustrative examples to adjust values of characteristics to the same scale. For example, when normalizing values for two different types of characteristics, such as fuel used and noise level, the process may also include a step for converting and scaling results of one type of measurement to another type of measurement.

The illustration of route modeler 116 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional components in addition to the components shown in route modeler 116 may be present. For example, an application in applications 142 in FIG. 1 to store information 214, values 223, and number of new routes 136 may be included in route modeler 116. As another example, another application in applications 142 to retrieve entity input 114, information 214, and routes 130 may be included in route modeler 116. In this case, when applications 142 retrieve and store information, applications 142 may, for example, use route modeling database 122 in FIG. 1.

Although the components shown in FIG. 2 are depicted in separate locations, these components may be part of route modeling database 122 in these illustrative examples. For example, values 223, models 216, and other types of information may be stored in route modeling database 122 and retrieved by route modeler 116. In still other illustrative examples, information generated for area of interest 204, entities 112 in FIG. 1, number of new routes 136, or other information may be stored in route modeling database 122 for use in later simulations by route modeler 116.

Figure 3:
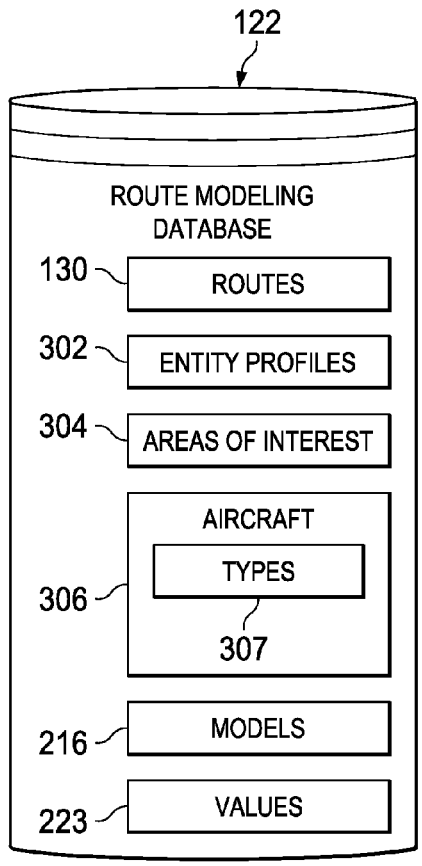
FIG. 3 is an illustration of a block diagram of components of a route modeling database involved in processing routes for aircraft in accordance with an illustrative embodiment.

With reference now to FIG. 3, an illustration of a block diagram of components of a route modeling database involved in processing routes for aircraft is depicted in accordance with an illustrative embodiment. As depicted, an example of route modeling database 122 from FIG. 1 is shown.

In these illustrative examples, routes 130, entity profiles 302, areas of interest 304, aircraft 306, models 216, and values 223 are examples of information that may be stored in route modeling database 122. As depicted, models 216 may include environmental models, economic models, flight models, and other suitable types of models for characteristics of routes for aircraft. In these depicted examples, aircraft 306 comprises information about one or more types 307 of aircraft 306 for use in processing routes.

In the different illustrative examples, a type of aircraft in types 307 is a particular model of an aircraft. Each type of aircraft in types 307 may include a particular configuration of the aircraft for the particular model. For example, two aircraft of the same model may be configured with different equipment, such as different engines. In this example, the type of the aircraft may be further identified by a tail number of the aircraft and by a particular configuration for the equipment of the aircraft. Of course, in other illustrative examples, types 307 may include different classes of aircraft and/or different models of each class of aircraft. For example, without limitation, types 307 may include two models of commercial aircraft, three models of rotorcraft, one model of cargo aircraft, and other suitable classes of aircraft, depending on the particular implementation.

Figure 4:
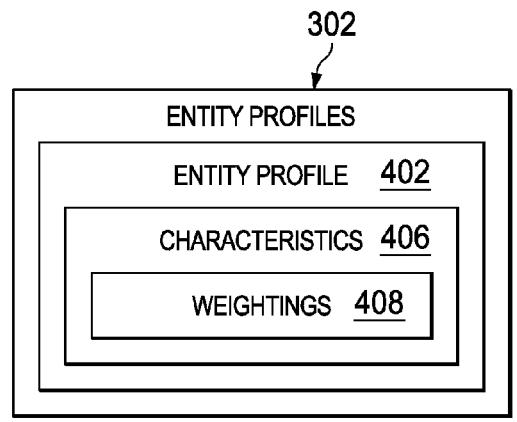
FIG. 4 is an illustration of a block diagram of entity profiles for processing routes for aircraft in accordance with an illustrative embodiment.

Turning next to FIG. 4, an illustration of a block diagram of entity profiles for processing routes for aircraft is depicted in accordance with an illustrative embodiment. Entity profiles 302 may be used to increase efficiency of routes 130 for an aircraft in these depicted examples.

In these illustrative examples, entity profiles 302 include one or more profiles for entities using route modeler 116 in FIG. 1. For example, entity profiles 302 may include one or more profiles for one or more entities in entities 112 in FIG. 1. Each profile in entity profiles 302 contains information about an entity. Each profile may be stored in various forms such as a record, flat file, or in some other suitable format.

As depicted, entity profile 402 is an entity profile located in entity profiles 302. In these illustrative examples, entity profile 402 includes weightings 408 for characteristics 406. Weightings 408 for characteristics 406 of an entity with entity profile 402 may be selected in a number of different ways. For example, weightings 408 for characteristics 406 may be selected by at least one of an entity, an administrator, a rule specifying default weightings 408 for characteristics 406, or in some other suitable manner.

For example, a particular entity in entities 112 may first identify selected characteristics 137 in FIG. 1. Characteristics 406 are one example of selected characteristics 137 for a particular entity. Characteristics 406 are included in entity profile 402.

Next, the entity may identify weightings 408 for characteristics 406. Weightings 408 for characteristics 406 also may be included in entity profile 402 for the particular entity. With entity profile 402, route modeler 116 may retrieve information for a particular entity when processing routes 130, generating number of new routes 136, or for use in other processes in route modeling environment 100 in FIG. 1.

Figure 5:
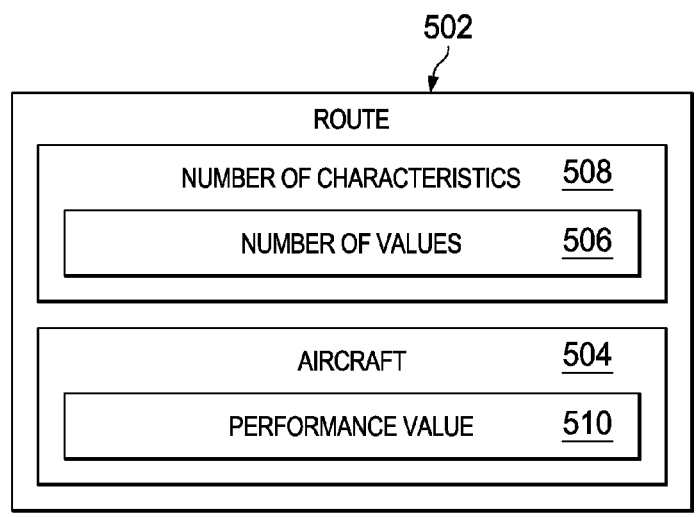
FIG. 5 is an illustration of a block diagram of values for characteristics of routes for aircraft in accordance with an illustrative embodiment.

Turning next to FIG. 5, an illustration of a block diagram of values for characteristics of routes for aircraft is depicted in accordance with an illustrative embodiment. In these illustrative examples, route modeler 116 may use simulator 222 to generate number of values 506 for number of characteristics 508 for route 502.

In this illustrative example, number of values 506 for number of characteristics 508 is an example of values 223 for number of characteristics 135 in FIG. 2. Route 502 is an example of new route 140 in FIG. 2. As depicted, route modeler 116 may use a results generator, such as results generator 230 in FIG. 2, to calculate performance value 510 for aircraft 504 along route 502.

Performance value 510 is a value serving as a measure of a process.

Performance value 510 for route 502 may be used to compare route 502 to another route having a performance value. In other words, the performance values may be used to provide a comparison of routes to each other. This comparison may be made even though different routes may have different values for the different characteristics based on at least one of the aircraft, the route, or weightings selected for characteristics.

For example, performance value 510 may be a value representing the performance of an aircraft on a route. For instance, performance value 510 may be calculated based on number of values 506 for number of characteristics 508 of route 502 and a number of weightings for each of number of characteristics 508.

In these illustrative examples, a weighting in the number of weightings for a characteristic in number of characteristics 508 identifies an importance of the characteristic relative to another characteristic in number of characteristics 508. For instance, a higher value for the weighting in the number of weightings for a characteristic in number of characteristics 508 corresponds to a higher importance of the characteristic relative to another characteristic in number of characteristics 508 with a lower value.

In this example, performance value 510 may be calculated using the formula:

$$\text{performance value} = \text{weighting}_1(\text{value for characteristic}_1) + \text{weighting}_2(\text{value for characteristic}_2) + \ldots$$

In this example, performance value 510 for aircraft 504 on route 502 may be a value representing the performance of aircraft 504 on route 502. Performance value 510 takes into account weightings for number of characteristics 508 for aircraft 504. Performance value 510 for aircraft 504 on route 502 may then be used to compare route 502 with a performance value of aircraft 504 on a number of additional routes.

Additionally, performance value 510 may be compared to performance value for the same route with a different aircraft, a different route with a different aircraft, or some other combination thereof. In this manner, a selection of at least one of a route in an aircraft may be made through comparison of performance values.

Figure 6:
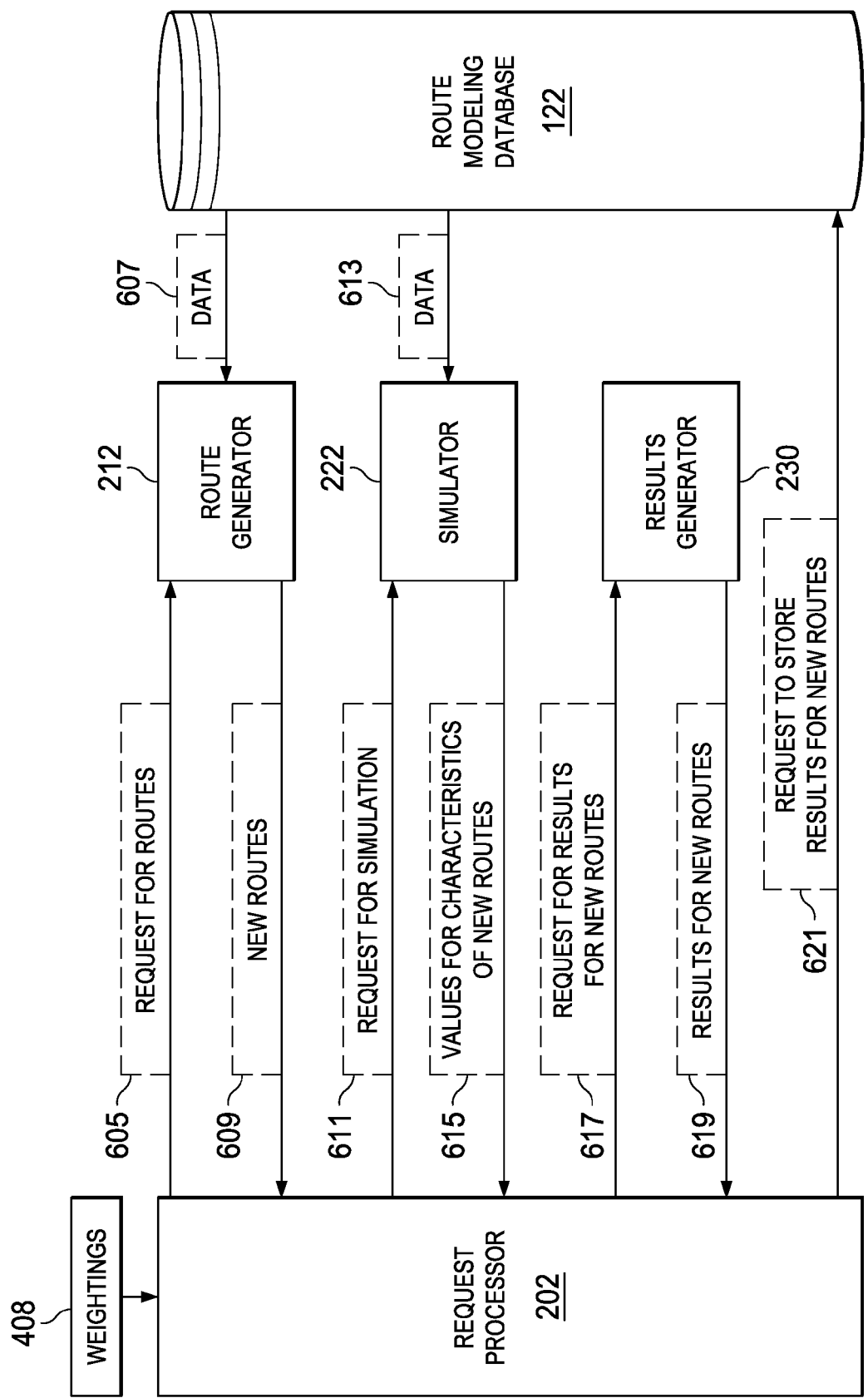
FIG. 6 is an illustration of a data flow for processing routes for aircraft in accordance with an illustrative embodiment.

Turning next to FIG. 6, an illustration of a data flow for processing routes for aircraft is depicted in accordance with an illustrative embodiment. The messages in FIG. 6 may be received, processed, and generated by components of route modeler 116 in FIG. 2. In particular, the process may be implemented in software, hardware, or a combination of the two in route modeler 116 in FIG. 2.

The process begins with request processor 202 receiving weightings 408. The process next sends request for routes 605 to route generator 212. Route generator 212 then retrieves data 607 from route modeling database 122. Next, route generator 212 generates and sends new routes 609 to request processor 202.

The process then sends request for simulation 611 to simulator 222. Simulator 222 retrieves data 613 from route modeling database 122. Next, simulator 222 generates and sends values for characteristics of new routes 615 to request processor 202.

The process then sends request for results for new routes 617 to results generator 230. Next, results generator 230 generates and sends results for new routes 619 to request processor 202. The process then sends request to store results for new routes 621 to route modeling database 122.

In these illustrative examples, request processor 202 may filter routes in new routes 609 based on results for routes that do not meet a threshold for improvement. For example, a first number of entities may each select weightings for a first number of characteristics and a second number of entities may each select weightings for a second number of characteristics. In this example, a performance value may be determined for results for new routes 619 taking into account the weightings for the characteristics selected by the first number of entities and the second number of entities.

Additionally, request processor 202 may filter routes in results for new routes 609 based on performance values for each new route that do not meet a threshold for improvement. In this manner, a comparison of the performance values for each new route may be made and a new route may be selected taking into account the weightings for the characteristics selected by the first number of entities and the second number of entities.

In another example, one or more of the first number of characteristics selected by the first number of entities may be the same as one or more of the second number characteristics selected by the second number of entities. In this example another one or more of the first number of characteristics selected by the first number of entities may be characteristics that are not in the second number characteristics selected by the second number of entities.

The process may be repeated any number of times until the new routes are determined to meet the threshold for improvement. For example, the process may generate and send another request to route generator 212 for route generator 212 to generate additional new routes.

Additionally, this process also may be formed using different aircraft with the same route for different routes. In this manner, other alternatives other than routes may be explored in establishing routes for aircraft.

Figure 7:
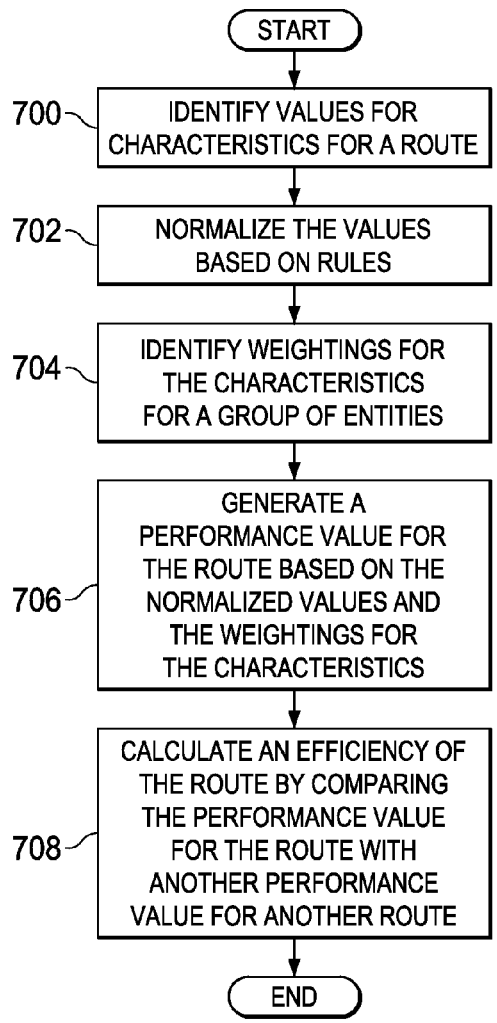
FIG. 7 is an illustration of a flowchart of a process for determining efficiency of a route for an aircraft in accordance with an illustrative embodiment.

Turning next to FIG. 7, an illustration of a flowchart of a process for determining efficiency of a route for an aircraft is depicted in accordance with an illustrative embodiment. The process illustrated in FIG. 7 may be implemented in results generator 230 in FIG. 2. In particular, the process illustrated in this figure may be implemented in software, hardware, or a combination of the two using components of results generator 230.

The process begins by identifying values for characteristics for a route (operation 700). In this illustrative example, the values for characteristics for a route may be an example of values 223 for a route in number of routes 138 for number of characteristics 135 in FIG. 2. The process then normalizes the values based on rules (operation 702). In this example, the rules for normalization are an example of normalization 232 in FIG. 2.

The process next identifies weightings for the characteristics for a group of entities (operation 704). The process generates a performance value for the route based on the normalized values and the weightings for the characteristics (operation 706). The process then calculates an efficiency of the route by comparing the performance value for the route with another performance value for another route (operation 708) with the process terminating thereafter.

Figure 8:
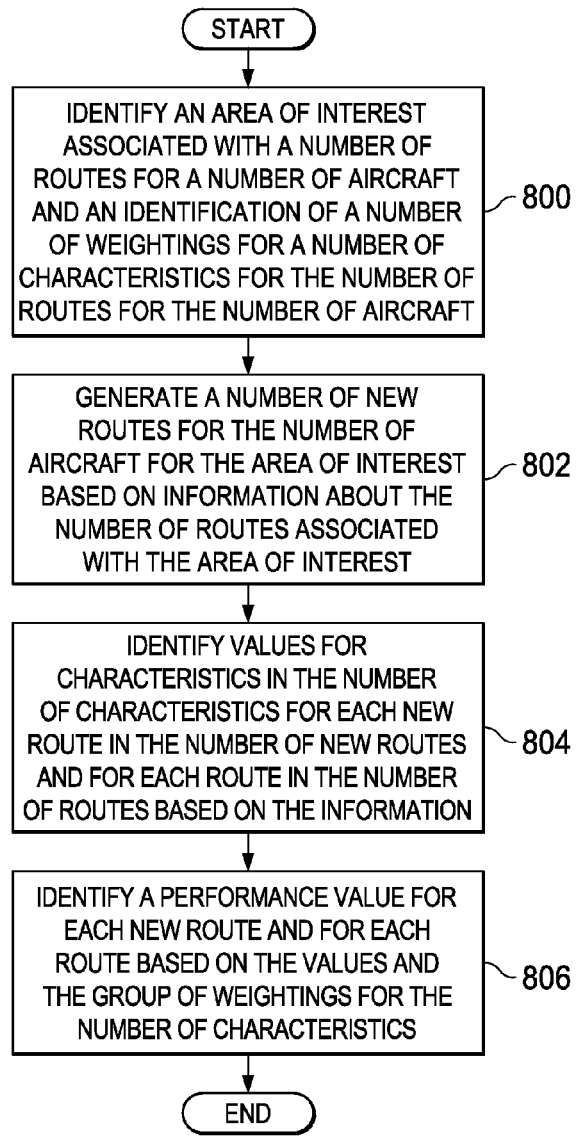
FIG. 8 is an illustration of a flowchart of a process for processing routes for aircraft for an area of interest in accordance with an illustrative embodiment.

Turning next to FIG. 8, an illustration of a flowchart of a process for processing routes for aircraft for an area of interest is depicted in accordance with an illustrative embodiment. The process illustrated in FIG. 8 may be implemented in software, hardware, or a combination of the two using components of route modeler 116 in FIG. 2.

The process begins by identifying an area of interest associated with a number of routes for a number of aircraft and an identification of a number of weightings for a number of characteristics for the number of routes for the number of aircraft (operation 800). The identification may be made using a number of entity inputs such that each entity input identifies one of a plurality of number of weightings 208.

In this illustrative example, the number of characteristics may include at least one of a number of environmental characteristics, a number of economic characteristics, or a combination of a number of environmental and economic characteristics. The area of interest is an example of area of interest 204 in FIG. 2. The number of routes is an example of number of routes 138 in FIG. 2 and the number of aircraft is an example of aircraft 306 in FIG. 3. Further, the number of weightings for the number of characteristics may be number of weightings 208 for number of characteristics 135 in FIG. 2.

The process generates a number of new routes for the number of aircraft for the area of interest based on information about the number of routes associated with the area of interest (operation 802). The number of new routes may be number of new routes 136 in FIG. 2.

The process next identifies values for characteristics in the number of characteristics for each new route in the number of new routes and for each route in the number of routes based on the information (operation 804). The values may be values 223 in FIG. 2.

The process then identifies a performance value for each new route and for each route based on the values and the number of weightings for the number of characteristics (operation 806) with the process terminating thereafter. Each performance value for each new route and for each route is an example of performance value 510 in FIG. 5. The process may also include additional steps for filtering routes in the number of new routes and the number of routes based on whether the performance value for each respective route meets a threshold for improvement.

Figure 9:
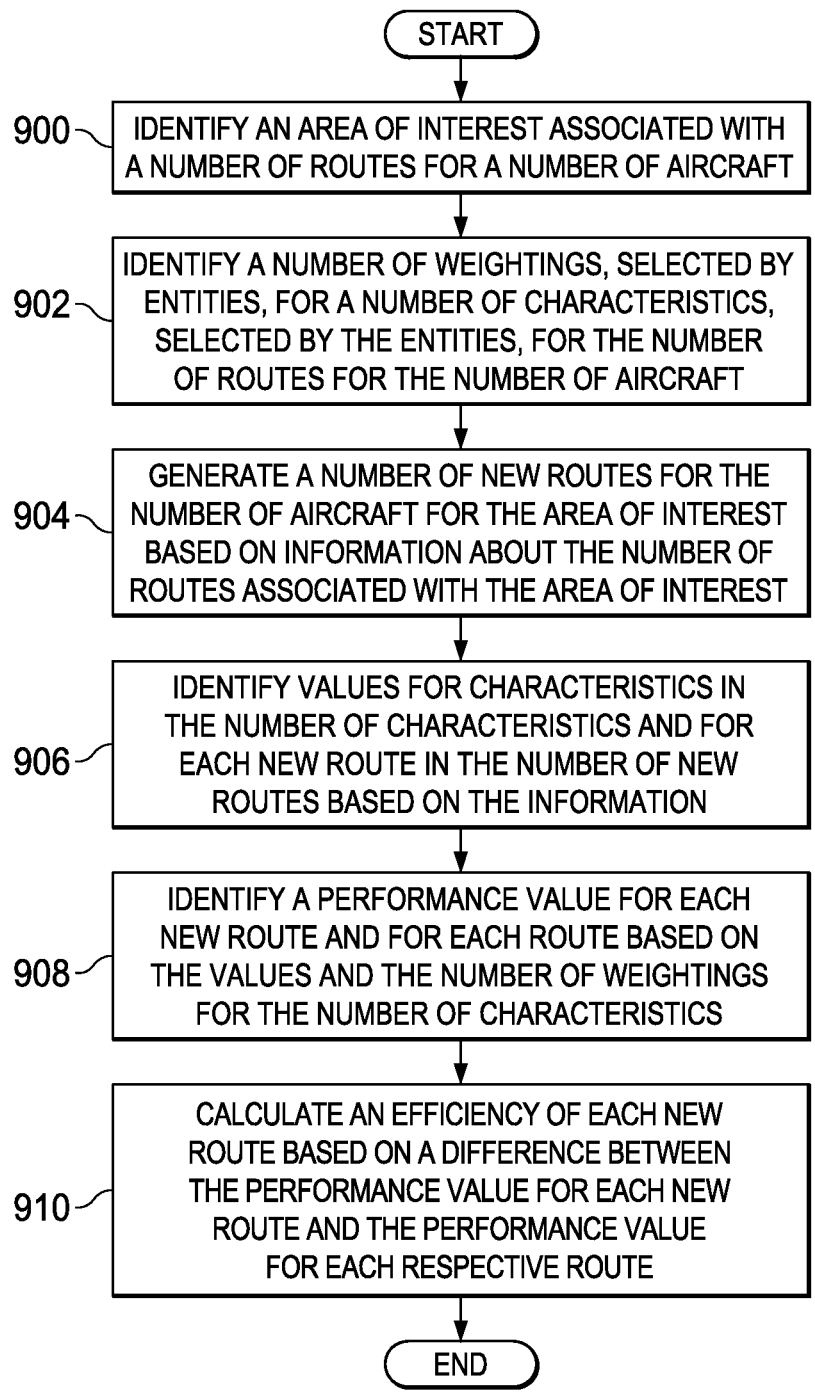
FIG. 9 is an illustration of a flowchart of a process for processing routes for aircraft for an area of interest in accordance with an illustrative embodiment.

Turning next to FIG. 9, an illustration of a flowchart of a process for processing routes for aircraft for an area of interest is depicted in accordance with an illustrative embodiment. In particular, the process illustrated in this figure is implemented based on a number of weightings for a number of characteristics selected by entities 112. The process illustrated in FIG. 9 may be implemented in software, hardware, or a combination of the two using components of route modeler 116.

The process begins by identifying an area of interest associated with a number of routes for a number of aircraft (operation 900). The process identifies a number of weightings, selected by entities, for a number of characteristics, selected by the entities, for the number of routes for the number of aircraft (operation 902). For example, the number of characteristics may include at least one of a number of environmental characteristics, a number of economic characteristics, or a combination of a number of environmental and economic characteristics. In this illustrative example, number of weightings 208 for number of characteristics 135 in FIG. 2 may be identified by entities 112 in FIG. 1 for area of interest 204 in FIG. 2.

The process generates a number of new routes for the number of aircraft for the area of interest based on information about the number of routes associated with the area of interest (operation 904). The number of new routes may be number of new routes 136 in FIG. 2.

The process next identifies values for characteristics in the number of characteristics for each new route in the number of new routes and for each route in the number of routes based on the information (operation 906). The values may be values 223 in FIG. 2.

The process then identifies a performance value for each new route and for each route based on the values and the number of weightings for the number of characteristics (operation 908). Each performance value for each new route and for each route is an example of performance value 510 in FIG. 5.

The process calculates an efficiency of each new route based on a difference between the performance value for each new route and the performance value for each respective route (operation 910) with the process terminating thereafter.

In some illustrative examples, operation 910 may be omitted. In other illustrative examples, operation 904, operation 906, and operation 910 may be omitted. In other words, the process may identify an area of interest, a number of routes for a number of aircraft, a number of weightings for a number of characteristics, and performance values representing a performance of the number of aircraft without generating new routes.

In still other illustrative examples, the process may select a desired route based on a comparison of the performance values of a number of routes, a number of new routes, or a combination thereof. Further, a desired aircraft may be selected from the number of aircraft based on a comparison of the performance values for the number of new routes and the number of routes. Additionally, in some illustrative examples, a design of the number of aircraft, modifications to the number of aircraft, upgrades to the number of aircraft, a change in land use in the area of interest, or other suitable changes to routes, aircraft, land, or a combination thereof may be made based on a comparison of these performance values.

Figure 10:
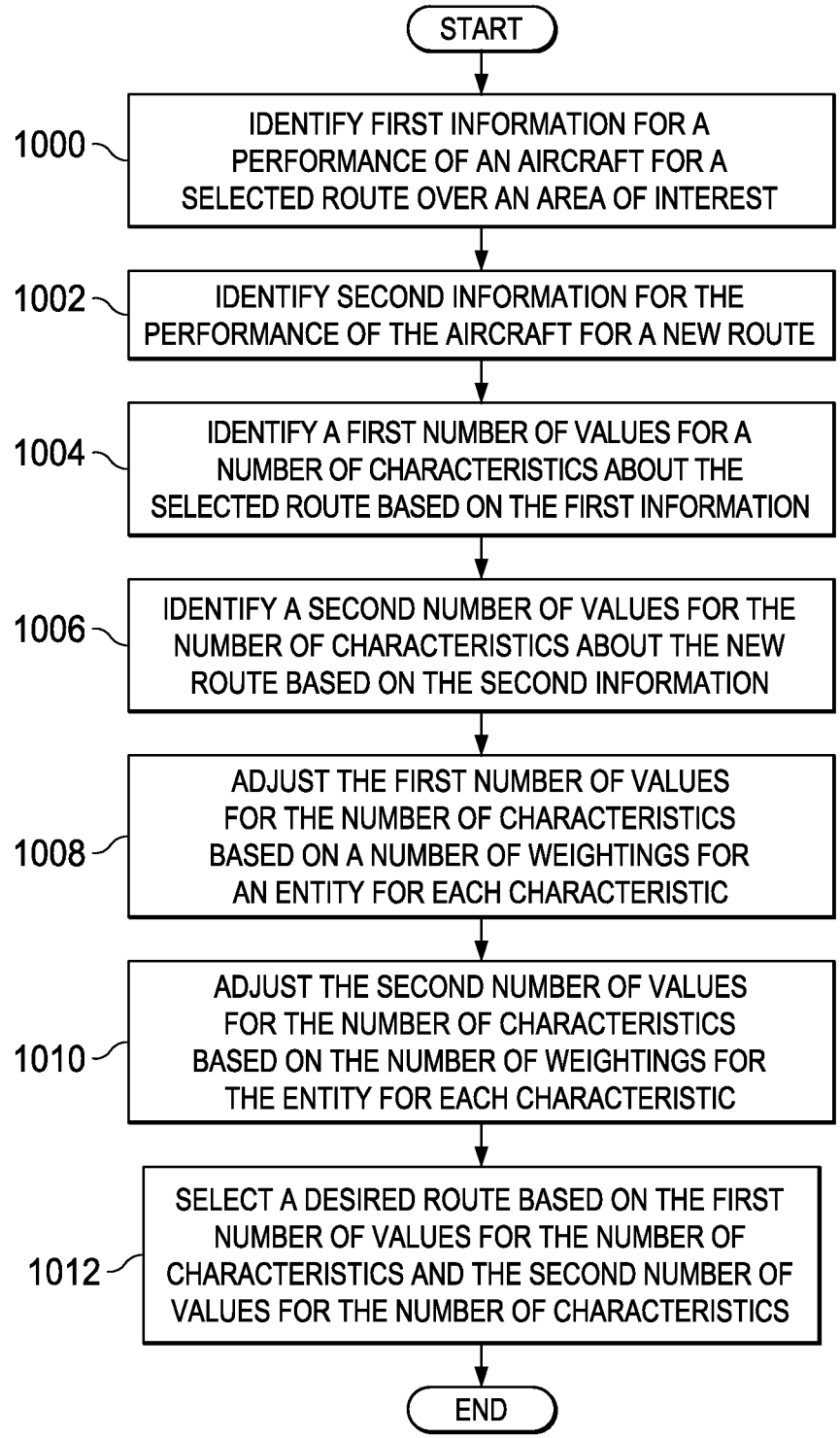
FIG. 10 is an illustration of a flowchart of a process for increasing aircraft efficiency for routes over an area of interest in accordance with an illustrative embodiment.

Turning next to FIG. 10, an illustration of a flowchart of a process for increasing aircraft efficiency for routes over an area of interest is depicted in accordance with an illustrative embodiment. The process illustrated in FIG. 10 may be implemented in route modeler 116 in FIG. 2.

The process begins by identifying first information for a performance of an aircraft for a selected route over an area of interest (operation 1000). The aircraft may be a first type of aircraft. The process next identifies second information for the performance of the aircraft for a new route (operation 1002). In this illustrative example, the second information may be identified for a performance of a second type of aircraft that is the same or different from the first type of aircraft.

In these depicted examples, the first information and the second information are examples of portions of information 214 in FIG. 2 for aircraft 306 in FIG. 3. In these illustrative examples, the selected route may be a route in routes 130 or number of new routes 136 over area of interest 204 in FIG. 2. For example, route modeler 116 may identify a route in routes 130 and new route 140 in number of new routes 136 based on entity input 114 in FIG. 2.

In these illustrative examples, the first information and the second information may be identified from at least one of actual aircraft performance data or a group of models. The actual performance data may be generated during flight of the aircraft along at least one of the selected route or the new route. The group of models is configured to generate simulated aircraft performance data in these illustrative examples.

The process identifies a first number of values for a number of characteristics about the selected route based on the first information (operation 1004). Next, the process identifies a second number of values for the number of characteristics about the new route based on the second information (operation 1006). In this depicted example, the values are values 223 in FIG. 2.

The process then adjusts the first number of values for the number of characteristics based on a number of weightings for an entity for each characteristic (operation 1008). The number of weightings may be selected from a plurality of numbers of weightings for a plurality of entities. For example, weightings 408 for characteristics 406 may be selected using entity profile 402 in FIG. 4 for one of entities 112 in FIG. 1. The first number of values for the number of characteristics may be adjusted based on a plurality of numbers of weightings for a plurality of entities for each characteristic in these illustrative examples.

Next, the process adjusts the second number of values for the number of characteristics based on the number of weightings for the entity for each characteristic (operation 1010). The number of weightings for the number of characteristics may be number of weightings 208 for number of characteristics 135 in FIG. 2. The second number of values for the number of characteristics also may be adjusted based on the plurality of numbers of weightings for the plurality of entities for each characteristic.

The process then selects a desired route based on the first number of values for the number of characteristics and the second number of values for the number of characteristics (operation 1012) with the process terminating thereafter. In operation 1012, the selection of the desired route may be made, for example, by selecting the desired route from one of the selected route in routes 130 and new route 140 based on the first number of values for number of characteristics 135 and the second number of values for number of characteristics 135.

The process may also identify additional information for a number of additional routes, identify an additional number of values for the number of characteristics about the number of additional routes based on the additional information, and select a desired route from the selected route, the new route, and the number of additional routes, depending on the particular implementation. This process of identifying another route as the selected route may end once all routes in routes 130 have been selected.

Moreover, the process may identify a number of different routes, identify the additional number of characteristics, and select a desired route based on a number of different types of aircraft. For example, the process may repeat itself for two types of aircraft, ten types of aircraft, seventeen types of aircraft, or some other number of aircraft in a fleet. In this manner, the process identifies and selects routes for different types of aircraft based on a number of characteristics with a number of weightings. As a result, more efficient routes for aircraft may be identified based on entity preferences.

Figure 11:
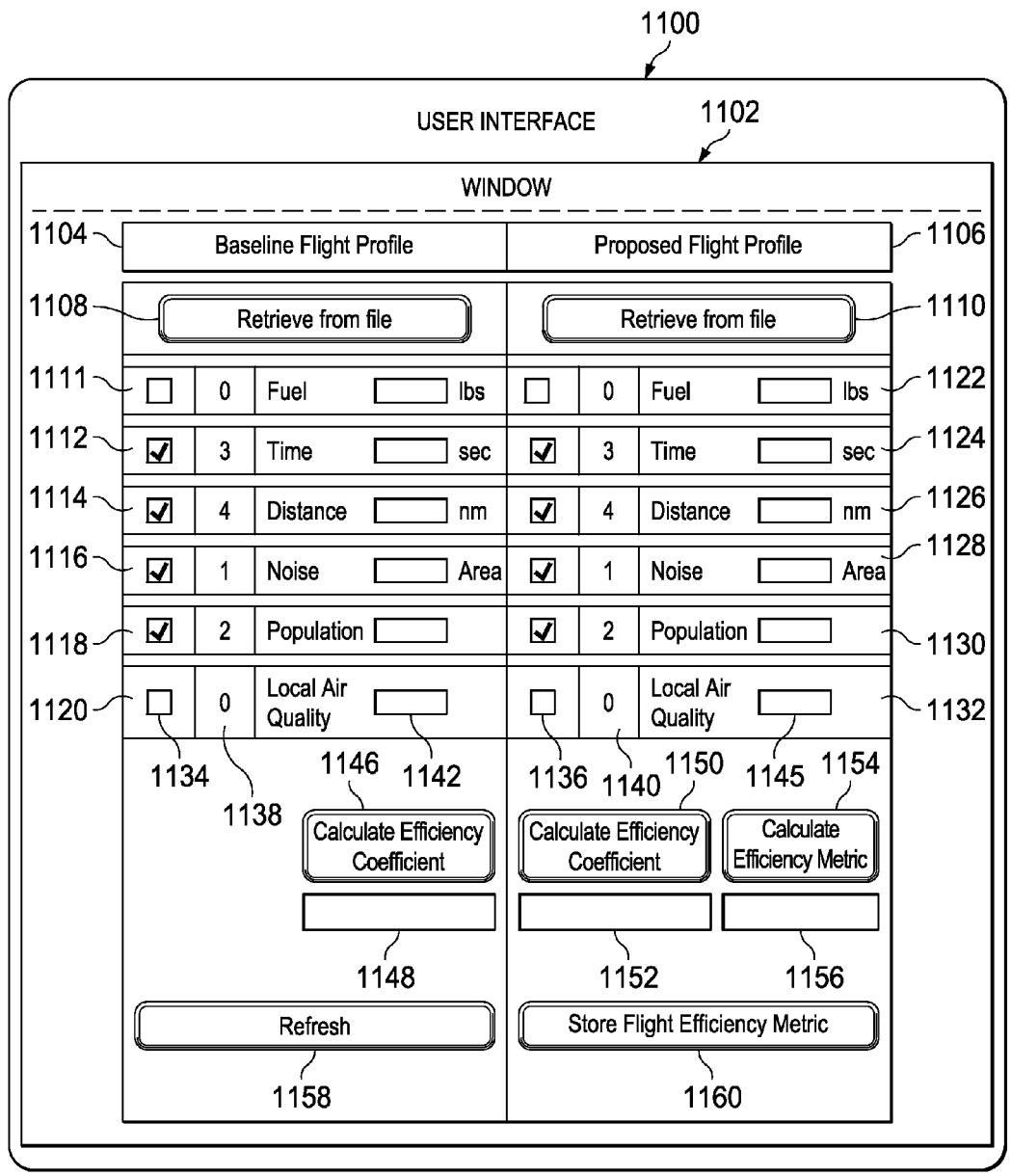
FIG. 11 is an illustration of a user interface for managing entity profiles in accordance with an illustrative embodiment.

Turning next to FIG. 11, an illustration of a user interface for managing entity profiles is depicted in accordance with an illustrative embodiment. User interface 1100 is an illustrative example of one implementation for a graphical user interface for route modeler 116 in FIG. 1 in route modeling environment 100 in FIG. 1. In other illustrative examples, user interface 1100 may also be any type of user interface suitable for presenting the contents of user interface 1100 to one or more operators.

In this illustrative example, user interface 1100 includes a user interface window of route modeler 116. Window 1102 is a window present in user interface 1100 used for processing routes in route modeler 116. In particular, window 1102 is an example of user interface 110 in FIG. 1.

As depicted, window 1102 includes baseline flight profile 1104 and proposed flight profile 1106. In this illustrative example, baseline flight profile 1104 is an existing route and proposed flight profile 1106 is another route associated with baseline flight profile 1104. For example, proposed flight profile 1106 may be a route proposed for replacing baseline flight profile 1104 to increase aircraft efficiency. In this illustrative example, baseline flight profile 1104 is an example of a route in number of routes 138 in FIG. 1. Proposed flight profile 1106 is an example of new route 140 in FIG. 1.

In this illustrative example, retrieve from file 1108 is a button in window 1102 to select and retrieve baseline flight profile 1104 and retrieve information about baseline flight profile 1104. Retrieve from file 1110 is a button in window 1102 to select proposed flight profile 1106 and retrieve information about proposed flight profile 1106. As another example, buttons for initiating a process to select and retrieve routes from route modeling database 122 in FIG. 1 may be provided instead of retrieve from file 1108 and retrieve from file 1110. For example, files corresponding to retrieve from file 1108, files corresponding to retrieve from file 1110, or both may be spreadsheet files, text delimited files, records in a database, or any other suitable sources of information about routes.

As depicted, fuel 1111, time 1112, distance 1114, noise 1116, population 1118, and local air quality 1120 are characteristics included in window 1102 for baseline flight profile 1104. As also depicted, fuel 1122, time 1124, distance 1126, noise 1128, population 1130, and local air quality 1132 are characteristics included in window 1102 for proposed flight profile 1106. In this illustrative example, the characteristics in window 1102 are examples of number of characteristics 135 in FIG. 2. The identification of characteristics may be based on a previous selection by entities 112 in FIG. 1. Entities 112 may further narrow the characteristics shown in window 1102 as well.

In this illustrative example, selection boxes 1134 are buttons used to select characteristics for baseline flight profile 1104. Selection boxes 1136 are buttons used to select characteristics for proposed flight profile 1106. In this illustrative example, the selection of characteristics for baseline flight profile 1104 and proposed flight profile 1106 may include selecting the same characteristics for baseline flight profile 1104 and proposed flight profile 1106 for comparing baseline flight profile 1104 to proposed flight profile 1106.

As depicted, weightings 1138 are fields used to select weightings for characteristics for baseline flight profile 1104. As also depicted, weightings 1140 are fields used to select weightings for characteristics for proposed flight profile 1106. In this illustrative example, weightings in window 1102 are examples of number of weightings 208 in FIG. 2.

In this illustrative example, values 1142 are for each characteristic in baseline flight profile 1104 and values 1145 are for each characteristic in proposed flight profile 1106. Values in window 1102 are examples of values 223 in FIG. 2.

Calculate efficiency coefficient 1146 is a button in window 1102 to initiate a request to identify performance value 1148 for baseline flight profile 1104. Calculate efficiency coefficient 1150 is a button in window 1102 to initiate a request to identify performance value 1152 for proposed flight profile 1106. Calculate efficiency metric 1154 is a button in window 1102 to initiate a request to identify efficiency 1156 for proposed flight profile 1106 over baseline flight profile 1104.

Refresh 1158 is a button in entity input 114 in FIG. 2 to return window 1102 to a default state. For example, selecting refresh 1158 may unselect baseline flight profile 1104 and propose flight profile 1106; and clear all of the fields in entity input 114.

Store flight efficiency metric 1160 is a button in window 1102 for initiating a process to store information in window 1102. For example, the process to store the information in window 1102 may store the information in route modeling database 122 in FIG. 1.

Figure 12:
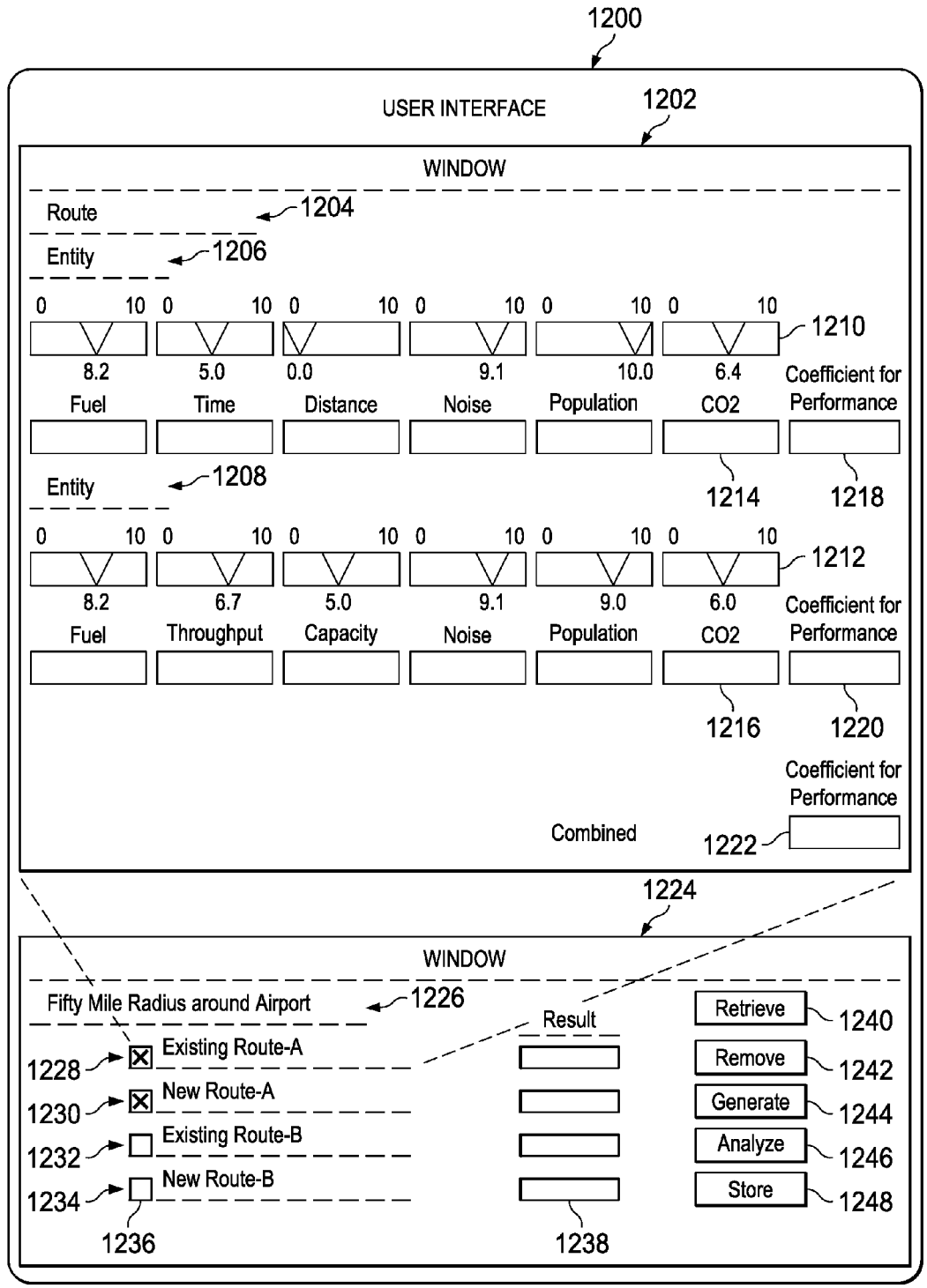
FIG. 12 is an illustration of a user interface for presenting efficiency of routes in accordance with an illustrative embodiment.

Turning next to FIG. 12, an illustration of a user interface for presenting efficiency of routes is depicted in accordance with an illustrative embodiment. User interface 1200 is an illustrative example of one implementation of a graphical user interface for route modeler 116 in route modeling environment 100 in FIG. 1. In other illustrative examples, user interface 1200 may also be any type of user interface suitable for presenting the contents of user interface 1200 to one or more operators.

In this illustrative example, user interface 1200 includes user interface windows of route modeler 116. Window 1202 is a window present in user interface 1200 used for processing routes in route modeler 116. In particular, window 1202 is an example of user interface 110 for planning routes 130 in FIG. 1.

As depicted, window 1202 includes information about route 1204. In this illustrative example, route 1204 is an example of a route in number of routes 138 in FIG. 2. As depicted, the information about route 1204 in window 1202 includes information for one or more entities. Entity 1206 and entity 1208 are two examples of entities in entities 112 in FIG. 1.

In this illustrative example, weightings 1210 for characteristics for entity 1206 and weightings 1212 for characteristics for entity 1208 are slider bars for selecting the weightings for characteristics. Values 1214 for characteristics for entity 1206 and values 1216 for characteristics for entity 1208 are identified values for characteristics.

In this illustrative example, performance value 1218 for entity 1206 is identified based on values 1214 and weightings 1210 for entity 1206. Performance value 1220 for entity 1208 is identified based on values 1216 and weightings 1212 for entity 1208. As depicted, performance value 1222 is identified based on values 1214 and weightings 1210 for entity 1206 and values 1216 and weightings 1212 for entity 1208.

Window 1224 is another window present in user interface 1200 used in a process for processing routes in route modeler 116. In particular, window 1224 is an example of user interface 110 in FIG. 1.

As depicted, window 1224 includes information about routes associated with area 1226. In this illustrative example, area 1226 is a fifty mile radius around a particular airport. In other illustrative examples, area 1226 may be any suitable area of land for use by route modeler 116 in route modeling environment 100 in FIG. 1. In this illustrative example, area 1226 is selected by an operator, such as an entity in entities 112 in FIG. 1 and any other suitable user.

In this illustrative example, route 1228, route 1230, route 1232, and route 1234 are identified as routes associated with area 1226. The routes in window 1224 are examples of number of routes 138 in FIG. 2 and number of new routes 136 in FIG. 2. Selection boxes 1236 are buttons used to select routes. Results 1238 are fields in window 1224 for presenting performance values for routes. For example, results 1238 may be identified by results generator 230 in FIG. 2.

As depicted, retrieve 1240 is a button to retrieve routes associated with area 1226. Remove 1242 is a button for removing selected routes from window 1224. Generate 1244 is a button to initiate generation of new routes based on selected routes. Analyze 1246 is a button to initiate a process for identifying results 1238 for selected routes. Store 1248 is a button to store results 1238 for selected routes.

In this illustrative example, in response to selection of a route in window 1224, such as route 1228, window 1202 may be presented in user interface 1200 for the selected route. For example, in response to selecting route 1228, route 1204 is set as route 1228 and window 1202 is then presented for route 1228.

Figure 13:
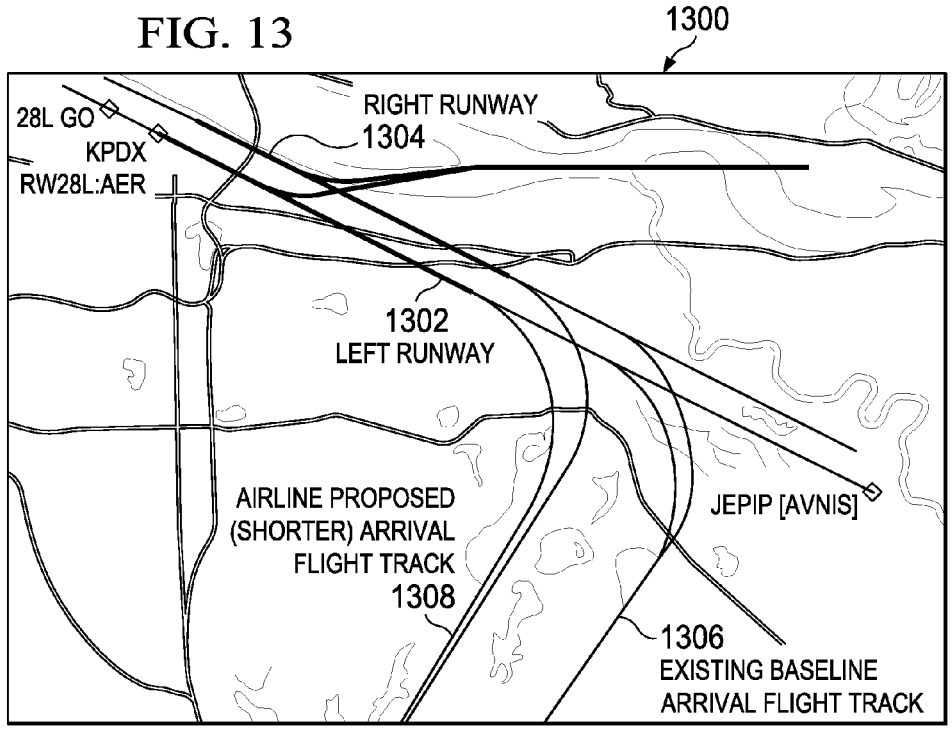
FIG. 13 is an illustration of a proposed route and an existing route in accordance with an illustrative embodiment.

Turning next to FIG. 13, an illustration of a proposed route and an existing route is depicted in accordance with an illustrative embodiment. Map 1300 is an illustrative example of a map for a scenario evaluating and quantifying environmental considerations for routes in which the lateral parts of the routes are modified to have desired characteristics. These characteristics may be based on the performance values identified for the routes.

In this illustrative example, map 1300 includes an area of land. The area of land shown on map 1300 is an example of a map of area of interest 204 in FIG. 2.

Map 1300 also shows left runway 1302 and right runway 1304. Map 1300 further includes existing routes 1306 and proposed routes 1308. Existing routes 1306 are examples of routes in number of routes 138 and proposed routes 1308 are examples of new routes in number of new routes 136 in FIG. 2.

In this illustrative example, an entity proposes new routes to reduce fuel burn by shortening the distance of the route. In other examples, another entity may propose new routes to lower noise over population and to reduce congestion in airspace. In these illustrative examples, the entity may desire to demonstrate environmental considerations for a change from existing routes to new routes.

Figure 14:
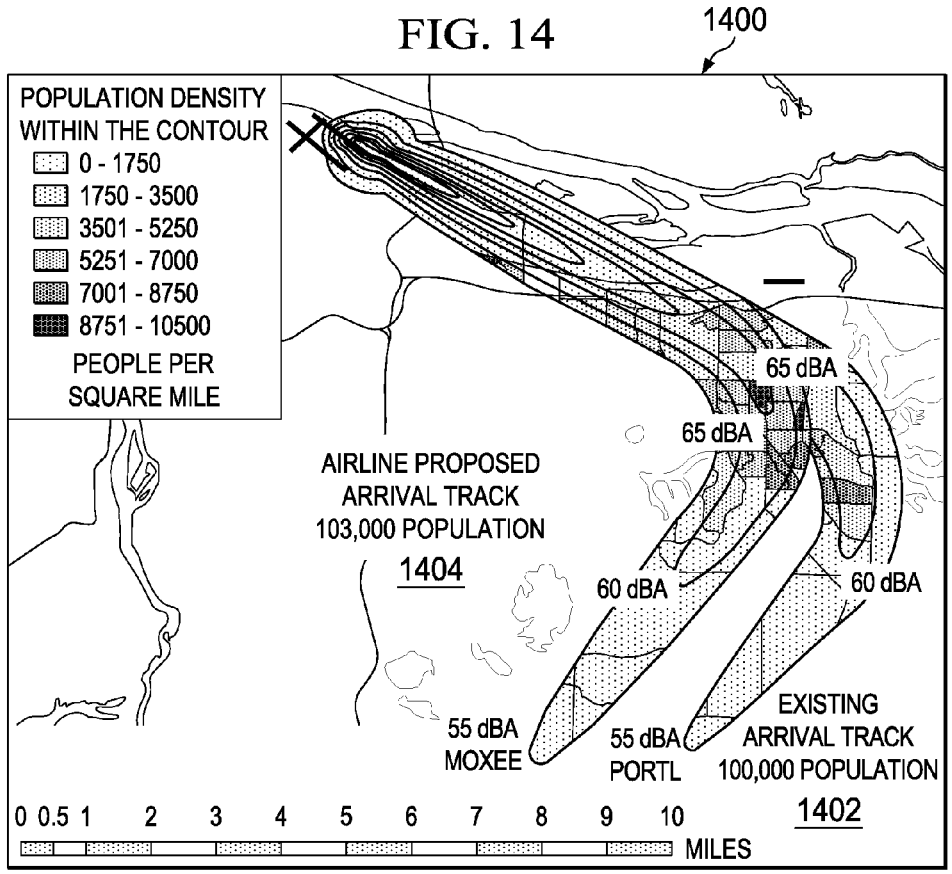
FIG. 14 is an illustration of population density for a proposed route and an existing route in accordance with an illustrative embodiment.

Turning next to FIG. 14, an illustration of population density for a proposed route and an existing route is depicted in accordance with an illustrative embodiment. Map 1400 is an illustrative example of a map of population density for the scenario evaluating and quantifying environmental considerations for routes in which the lateral parts of the routes are modified to have desired characteristics. These characteristics may be based on the performance values identified for the routes. In this illustrative example, population density is an example of a characteristic in number of characteristics 135 in FIG. 2.

In this depicted example, map 1400 includes population density for existing routes 1402 and population density for proposed routes 1404. As depicted, population density for existing routes 1402 is an example of a population impacted by existing routes 1306 in FIG. 13. Population density for proposed routes 1404 is an example of a population impacted by proposed routes 1308 in FIG. 13. For example, simulator 222 in FIG. 2 may generate population for routes using a population model in models 216.

As shown in map 1400, an increase in the number of people exposed to noise for the proposed routes is present. In this example, noise contours for aircraft along routes are the same for both the existing routes and proposed routes, because only lateral parts of the routes have changed.

Turning next to FIG. 15, an illustration of a table of normalization factors for population densities is depicted in accordance with an illustrative embodiment. Table 1500 includes normalization factors 1504 for measured population 1502. Table 1500 is an illustrative example of normalization 232 in FIG. 2.

Turning next to FIG. 16, an illustration of a graph of population density for a number of measurements is depicted in accordance with an illustrative embodiment. Graph 1600 is an illustrative example of values 1606 for number of measurements 1604 for characteristic 1602 for population impact over an area. Values 1606 are an example of environmental values 228 in FIG. 2.

Turning next to FIG. 17, an illustration of a graph of population density after a process of normalization is depicted in accordance with an illustrative embodiment. Graph 1700 is an illustrative example of values 1706 for number of measurements 1704 for characteristic 1702. In this illustrative example, characteristic 1702 is population impact over an area in which values 1706 are adjusted using normalization factors 1504 in FIG. 15. As another illustrative example, values 1706 may also be adjusted using the formula "20× $Log_{10}(value)$" to adjust each value in values 1706.

Figure 18:
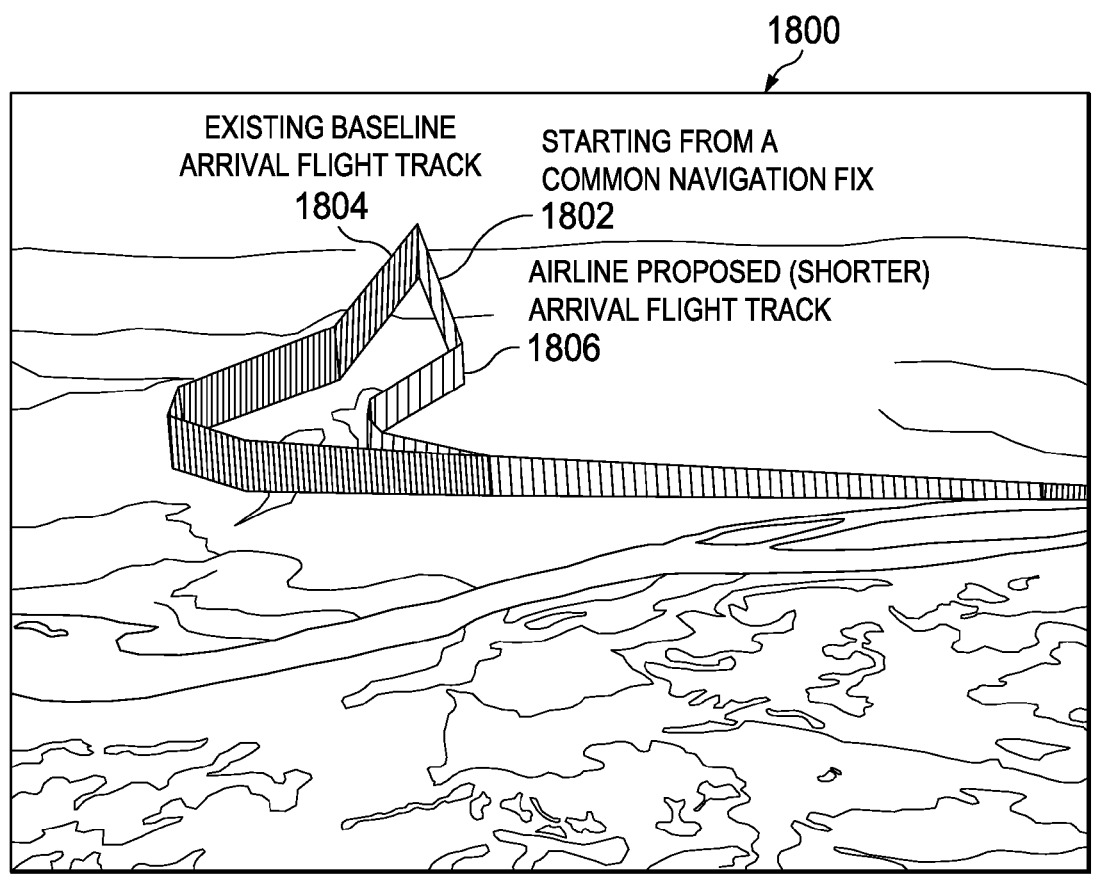
FIG. 18 is an illustration of a proposed route and an existing route in accordance with an illustrative embodiment.

Turning next to FIG. 18, an illustration of a proposed route and an existing route is depicted in accordance with an illustrative embodiment. Map 1800 is an illustrative example of a three-dimensional map for the scenario evaluating and quantifying environmental considerations for routes in which the lateral parts of the routes are modified to have desired characteristics. These characteristics may be based on the performance values identified for the routes.

In this illustrative example, map 1800 includes the area of land. The area of land shown on map 1800 is an example of a map of area of interest 204 in FIG. 2. Map 1800 also shows existing route 1804 and proposed route 1806 as sharing common navigation fix 1802. Common navigation fix 1802 is a point along a route that is shared by two or more routes. In these depicted examples, existing route 1804 is an example of a route in number of routes 138 and proposed route 1806 is an example of new route 140 in number of new routes 136 in FIG. 2.

Turning next to FIG. 19, an illustration of a table of values for characteristics for a proposed route and an existing route is depicted in accordance with an illustrative embodiment. Table 1900 is an illustrative example of values for characteristics for existing route 1804 and values for characteristics for proposed route 1806 in FIG. 18.

Turning next to FIG. 20, an illustration of a table of values for differences in characteristics between an existing route and a proposed route is depicted in accordance with an illustrative embodiment. Table 2000 is an illustrative example of differences between values for characteristics for existing route 1804 and values for characteristics for proposed route 1806 in FIG. 18. In this illustrative example, table 2000 also shows weightings for the characteristics.

Figures 21, 22:
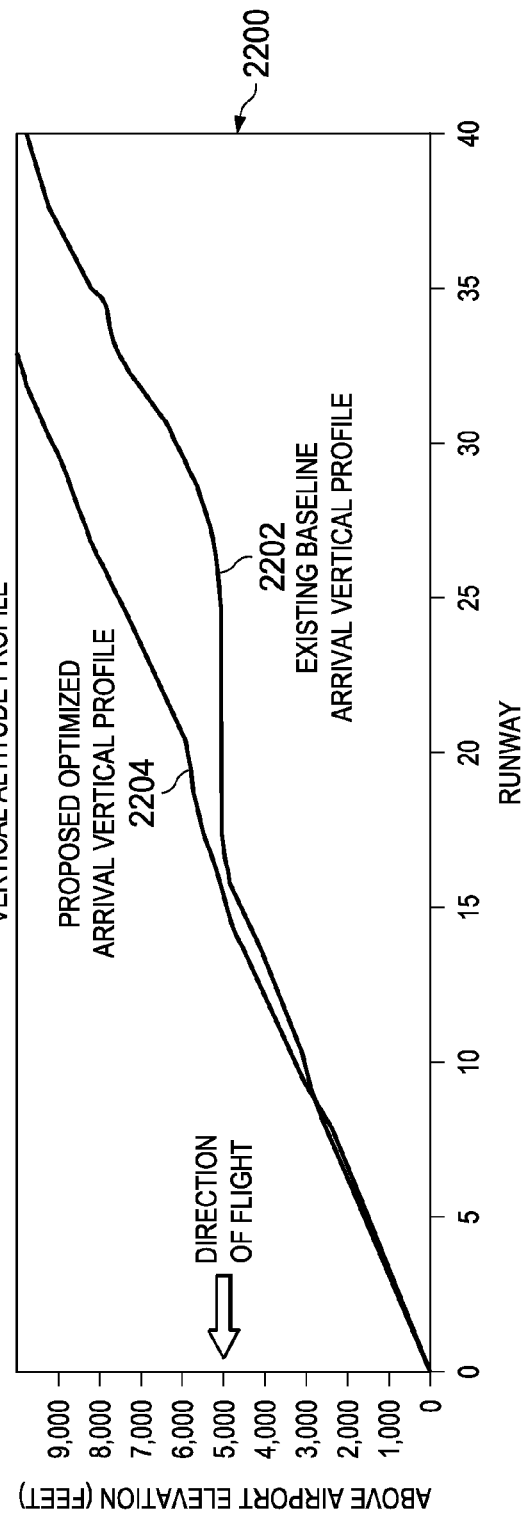
FIG. 21 is an illustration of a table of values for differences in characteristics between an existing route and a proposed route after weighting has been applied in accordance with an illustrative embodiment.
FIG. 22 is an illustration of a graph of elevations for an existing route and a proposed route in accordance with an illustrative embodiment.

Turning next to FIG. 21, an illustration of a table of values for differences in characteristics between an existing route and a proposed route after weighting has been applied is depicted in accordance with an illustrative embodiment. Table 2100 is an illustrative example of an identification of efficiency for a number of differences between values for characteristics for existing route 1804 and values for characteristics for proposed route 1806 in FIG. 18. In this illustrative example, the values have been adjusted based on the weightings in FIG. 20. Table 2100 demonstrates a benefit of "−17.33" to proposed route 1806 over existing route 1804 based on the weightings.

Turning next to FIG. 22, an illustration of a graph of elevations for an existing route and a proposed route is depicted in accordance with an illustrative embodiment. Graph 2200 is an illustrative example of values for a characteristic of elevation of aircraft along a route. In this illustrative example, a proposed route was generated by route modeler 116 in FIG. 1 by modifying the vertical parts of an existing route such that the new route has desired characteristics. Elevation of aircraft is an example of a characteristic in number of characteristics 135 in FIG. 2.

As depicted, graph 2200 includes values for an existing route 2202 and values for a proposed route 2204 in which the vertical parts of the existing route are modified to have desired characteristics. As depicted, the existing route contains a portion that is 10 miles long where level flight at 5,000 feet of altitude is maintained. The existing route is an example of a route in number of routes 138 and the proposed route is an example of new route 140 in number of new routes 136 in FIG. 2. Values for an existing route 2202 and values for a proposed route 2204 are examples of values 223 in FIG. 2.

Figure 23:
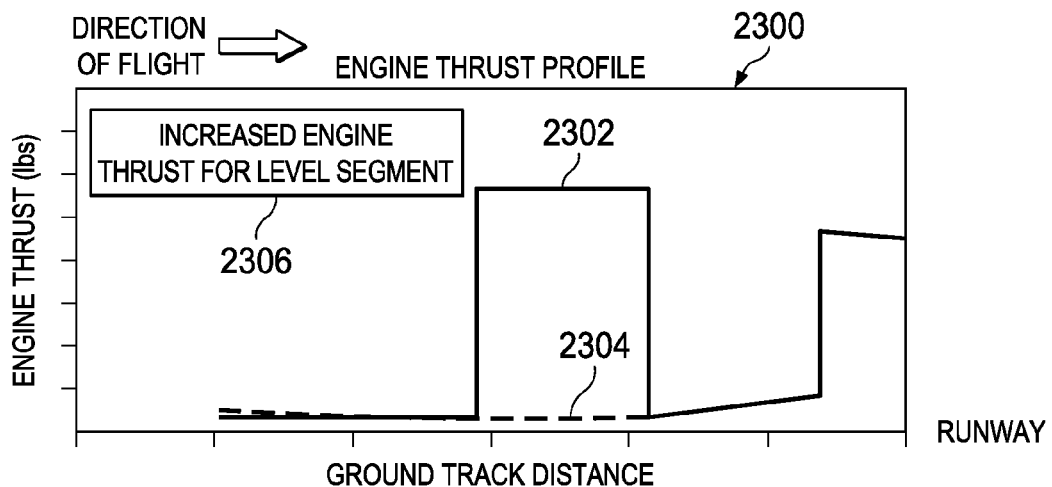
FIG. 23 is an illustration of a graph of engine thrust for an existing route and a proposed route in accordance with an illustrative embodiment.

Turning next to FIG. 23, an illustration of a graph of engine thrust for an existing route and a proposed route is depicted in accordance with an illustrative embodiment. Graph 2300 is an illustrative example of values for a characteristic of engine thrust of aircraft along a route. Engine thrust is an example of a characteristic in number of characteristics 135 in FIG. 2.

As depicted, graph 2300 includes values 2302 corresponding to values for an existing route 2202 in FIG. 22 and values 2304 corresponding to values for a proposed route 2204 in FIG. 22. As depicted, portion 2306 of the existing route has an increase in engine thrust. In this illustrative example, portion 2306 requires the aircraft to increase engine thrust to maintain level flight.

Figure 24:
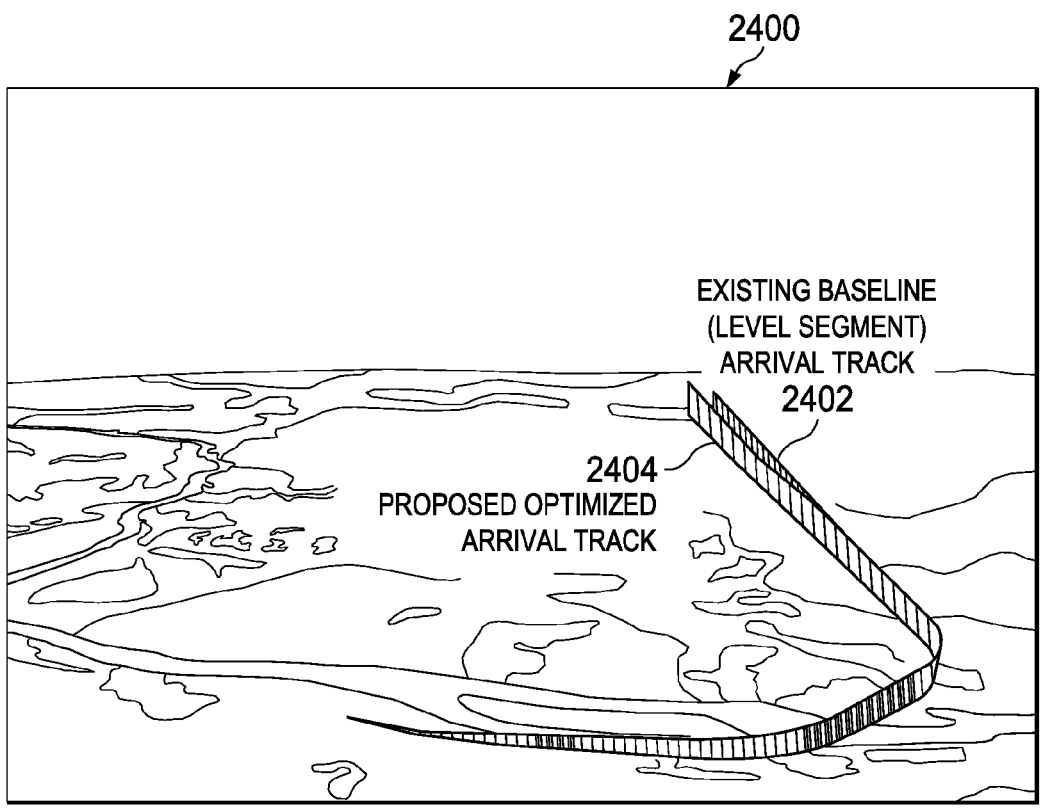
FIG. 24 is an illustration of a proposed route and an existing route in accordance with an illustrative embodiment.

Turning next to FIG. 24, an illustration of a proposed route and an existing route is depicted in accordance with an illustrative embodiment. Map 2400 is an illustrative example of a three dimensional map for an area of land. Map 2400 shows existing route 2402 based on values for an existing route 2202 in FIG. 22 and proposed route 2404 based on values for a proposed route 2204 in FIG. 22. The area of land shown on map 2400 is an example of a map of area of interest 204, existing route 2402 is an example a route in number of routes 138, and proposed route 2404 is an example of new route 140 in number of new routes 136 in FIG. 2.

Turning next to FIG. 25, an illustration of a table of values for characteristics for a proposed route and an existing route is depicted in accordance with an illustrative embodiment. Table 2500 is an illustrative example of values for characteristics for existing route 2404 and values for characteristics for proposed route 2406 in FIG. 24.

Turning next to FIG. 26, an illustration of a table of values for differences in characteristics between an existing route and a proposed route is depicted in accordance with an illustrative embodiment. Table 2600 is an illustrative example of differences between values for characteristics for existing route 2404 and values for characteristics for proposed route 2406 in FIG. 24. In this illustrative example, table 2600 also shows weightings for the characteristics.

Turning next to FIG. 27, an illustration of a table of values for differences in characteristics between an existing route and a proposed route in which weightings have been applied is depicted in accordance with an illustrative embodiment. Table 2700 is an illustrative example of an identification of efficiency for a number of differences between values for characteristics for existing route 2404 and values for characteristics for proposed route 2406 in FIG. 24. In this illustrative example, the values have been adjusted based on the weightings in table 2600 in FIG. 26. Table 2700 demonstrates a benefit of "−286" to proposed route 2406 over existing route 2404 based on the weightings.

Figure 28:
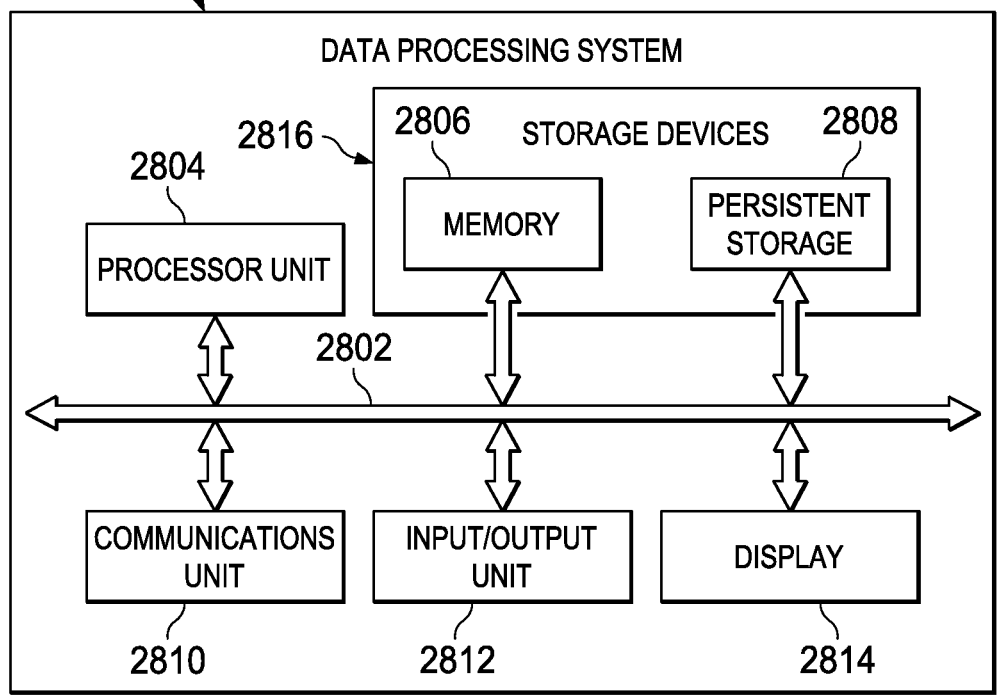
FIG. 28 is an illustration of a block diagram of a data processing system in accordance with an illustrative embodiment.

Turning next to FIG. 28, an illustration of a block diagram of a data processing system is depicted in accordance with an illustrative embodiment. In this illustrative example, data processing system 2800 may be used to implement one or more computers in computer system 118, clients 102, and route modeling database 122 in FIG. 1. As depicted, data processing system 2800 includes communications framework 2802, which provides communications between processor unit 2804, memory 2806, persistent storage 2808, communications unit 2810, input/output unit 2812, and display 2814.

Processor unit 2804 serves to execute instructions for software that may be loaded into memory 2806. Processor unit 2804 may be a number of processors, a multi-processor core, or some other type of processor, depending on the particular implementation. A number, as used herein with reference to an item, means one or more items. Further, processor unit 2804 may be implemented using a number of heterogeneous processor systems in which a main processor is present with secondary processors on a single chip. As another illustrative example, processor unit 2804 may be a symmetric multiprocessor system containing multiple processors of the same type.

Memory 2806 and persistent storage 2808 are examples of storage devices 2816. A storage device is any piece of hardware that is capable of storing information, such as, for example, without limitation, data, program code in functional form, and/or other suitable information either on a temporary basis and/or a permanent basis. Storage devices 2816 may also be referred to as computer readable storage devices in these examples. Memory 2806, in these examples, may be, for example, a random access memory or any other suitable volatile or non-volatile storage device. Persistent storage 2808 may take various forms, depending on the particular implementation.

For example, persistent storage 2808 may contain one or more components or devices. For example, persistent storage 2808 may be a hard drive, a flash memory, a rewritable optical disk, a rewritable magnetic tape, or some combination of the above. The media used by persistent storage 2808 also may be removable. For example, a removable hard drive may be used for persistent storage 2808.

Communications unit 2810, in these examples, provides for communications with other data processing systems or devices. In these examples, communications unit 2810 is a network interface card. Communications unit 2810 may provide communications through the use of either or both physical and wireless communications links.

Input/output unit 2812 allows for input and output of data with other devices that may be connected to data processing system 2800. For example, input/output unit 2812 may provide a connection for operator input through a keyboard, a mouse, and/or some other suitable input device. Further, input/output unit 2812 may send output to a printer. Display 2814 provides a mechanism to display information to an operator.

Instructions for the operating system, applications, and/or programs may be located in storage devices 2816, which are in communication with processor unit 2804 through communications framework 2802. In these illustrative examples, the instructions are in a functional form on persistent storage 2808. These instructions may be loaded into memory 2806 for execution by processor unit 2804. The processes of the different embodiments may be performed by processor unit 2804 using computer-implemented instructions, which may be located in a memory, such as memory 2806.

These instructions are referred to as program code, computer usable program code, or computer readable program code that may be read and executed by a processor in processor unit 2804. The program code in the different embodiments may be embodied on different physical or computer readable storage media, such as memory 2806 or persistent storage 2808.

Program code 2818 is located in a functional form on computer readable media 2820 that is selectively removable and may be loaded onto or transferred to data processing system 2800 for execution by processor unit 2804. Program code 2818 and computer readable media 2820 form computer program product 2822 in these examples. In one example, computer readable media 2820 may be computer readable storage media 2824 or computer readable signal media 2826.

Computer readable storage media 2824 may include, for example, an optical or magnetic disk that is inserted or placed into a drive or other device that is part of persistent storage 2808 for transfer onto a storage device, such as a hard drive, that is part of persistent storage 2808. Computer readable storage media 2824 also may take the form of a persistent storage, such as a hard drive, a thumb drive, or a flash memory, that is connected to data processing system 2800. In some instances, computer readable storage media 2824 may not be removable from data processing system 2800.

In these examples, computer readable storage media 2824 is a physical or tangible storage device used to store program code 2818 rather than a medium that propagates or transmits program code 2818. Computer readable storage media 2824 is also referred to as a computer readable tangible storage device or a computer readable physical storage device. In other words, computer readable storage media 2824 is a media that can be touched by a person.

Alternatively, program code 2818 may be transferred to data processing system 2800 using computer readable signal media 2826. Computer readable signal media 2826 may be, for example, a propagated data signal containing program code 2818. For example, computer readable signal media 2826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2818 may be downloaded over a network to persistent storage 2808 from another device or data processing system through computer readable signal media 2826 for use within data processing system 2800. For instance, program code stored in a computer readable storage medium in a server data processing system may be downloaded over a network from the server to data processing system 2800. The data processing system providing program code 2818 may be a server computer, a client computer, or some other device capable of storing and transmitting program code 2818.

The different components illustrated for data processing system 2800 are not meant to provide architectural limitations to the manner in which different embodiments may be implemented. The different illustrative embodiments may be implemented in a data processing system including components in addition to or in place of those illustrated for data processing system 2800. Other components shown in FIG. 28 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2804 may take the form of a hardware unit that has circuits that are manufactured or configured for a particular use. This type of hardware may perform operations without needing program code to be loaded into a memory from a storage device to be configured to perform the operations.

For example, when processor unit 2804 takes the form of a hardware unit, processor unit 2804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 2818 may be omitted because the processes for the different embodiments are implemented in a hardware unit.

In still another illustrative example, processor unit 2804 may be implemented using a combination of processors found in computers and hardware units. Processor unit 2804 may have a number of hardware units and a number of processors that are configured to run program code 2818. With this depicted example, some of the processes may be implemented in the number of hardware units, while other processes may be implemented in the number of processors.

In another example, a bus system may be used to implement communications framework 2802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 2806, or a cache, such as found in an interface and memory controller hub that may be present in communications framework 2802.

Thus, the illustrative embodiments provide a method, apparatus, and computer program product for processing routes. In one example, an apparatus comprises a route modeler configured to identify an area of interest associated with a number of routes for a number of aircraft. The route modeler is further configured to provide an identification of a number of weightings for a number of characteristics for the number of routes for the number of aircraft. The number of characteristics includes at least one of a number of environmental characteristics or a number of economic characteristics. The route modeler is further configured to generate a number of new routes for the number of aircraft for the area of interest based on information about the number of routes associated with the area of interest. The route modeler is still further configured to identify values for characteristics in the number of characteristics for each new route in the number of new routes and for each route in the number of routes based on the information. Additionally, the route modeler is configured to identify a performance value for the each new route in the number of new routes and for the each route in the number of routes based on the values and the number of weightings for the number of characteristics.

Entities may use the route modeler to redesign routes of an area to improve combinations of environmental characteristics and economic characteristics. More particularly, the route modeler may be used to analyze efficiency of routes for aircraft based on any number of environmental and economic impacts of aircraft along the routes. The route modeler then generates a value for the performance value of each route. This performance value enables quantification of information that was previously unquantifiable using currently available flight planning or route modeling systems. Improved routes for aircraft are then identified based on the performance value provided by the route modeler.

Moreover, an entity may use the performance value of each route to compare routes of different types of aircraft in a fleet. In this manner, the entity may compare the performance values between the same type of aircraft with different configurations, the same type of aircraft with different equipment, different models of aircraft, different classes of aircraft, or make some other suitable comparison. As a result, the entity may plan a fleet with different types of aircraft based on the desired performance of the aircraft along a number of routes.

For example, with a route where carbon emissions are a consideration, the use of one aircraft in the fleet may be desired over another aircraft in the fleet. In other examples, when decreased flight time is a consideration, a different type of aircraft may be used than when decreasing noise level over a populated area is a consideration. Thus, the entity is able to utilize its resources more efficiently and effectively with the use of an illustrative embodiment.

In addition, any number of entities may benefit from the use of an illustrative embodiment. For example, product development teams, air traffic management, avionics development teams, regulatory agencies, or any number of different entities may benefit from modification of routes for aircraft based on desired characteristics. For example, regulatory agencies may improve compliance with environmental guidelines for aircraft or set different guidelines using an illustrative embodiment. As another example, development teams may utilize an illustrative embodiment to determine the appropriate modifications or innovations to develop for different models of aircraft. In still other examples, air traffic management may use an illustrative embodiment to aid in directing air traffic based on desired characteristics at certain times of day.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising a route modeler in a processor unit configured to:
receive, a number of entity inputs that identify a number of environmental characteristics, and a number of economic characteristics, that affect an area of land and population by operation of a number of aircraft on a number of routes such that the number of environmental characteristics comprises at least two of: an amount of noise produced, a count of population affected, an amount of impact to local air quality of an area of interest, and airport environmental regulations;
receive, a number of entity inputs that identify a number of weightings for the number of environmental characteristics, and the number of economic characteristics, for the number of routes for the number of aircraft, such that each weighting in the number of weightings comprises a multiplicative factor applied to a particular characteristic in the number of characteristics
generate a number of new routes for the number of aircraft for the area of land based on information about the number of routes associated with the area of land;
identify values for characteristics, in the number of characteristics, for each new route in the number of new routes, and for each route in the number of routes, based on the information; and
identify a performance value for:

the each new route in the number of new routes, and for the each route in the number of routes, based on the values, and the number of weightings, for the number of characteristics.

2. The apparatus of claim 1, wherein the route modeler is further configured to filter the number of new routes based on the performance value for the each new route.

3. The apparatus of claim 1, wherein the route modeler is further configured to calculate an efficiency of the each new route based on a difference between the performance value for the each new route and the performance value for each respective route.

4. The apparatus of claim 1, wherein the route modeler is further configured to receive entity input selecting the number of characteristics.

5. The apparatus of claim 1, wherein the route modeler is further configured to determine which new routes in the number of new routes are valid based on rules for new routes associated with the area of land; and to remove, from the number of new routes, the new routes determined to be invalid.

6. The apparatus of claim 1, wherein the route modeler is further configured to generate the number of new routes for the number of aircraft for the area of land based on the information about the number of routes associated with the area of land by generating the number of new routes based on a first number of rules for modifying lateral parts of the number of routes associated with the area of land; and modifying vertical parts of the number of new routes based on a second number of rules for modifying the vertical parts of the number of routes.

7. The apparatus of claim 6, wherein the first number of rules and the second number of rules include rules for improving at least one of an amount of fuel used or duration of flight.

8. The apparatus of claim 1, wherein in identifying the number of weightings for the number of characteristics, one of a number of entity inputs is used such that each entity input identifies one of a plurality of numbers of weightings for the number of characteristics, and wherein computing the performance value for the each new route and for the each route is based on the values and the plurality of numbers of weightings for the number of characteristics.

9. An apparatus comprising a route modeler in a processor unit configured to;
identify first information for a performance of an aircraft for a selected route over an area of land and population affected by the selected route;
identify second information for the performance of the aircraft for a new route over an area of land and population affected by the new route;
identify a first number of values for a number of characteristics about the area of land and population affected by the selected route based on the first information, such that the number of characteristics comprises at least two of: an amount of noise produced, a count of population affected, an amount of impact to local air quality of an area of interest, and airport environmental regulations;
identify a second number of values for the number of characteristics about the area of land and population affected by the new route based on the second information;
adjust the first number of values, for the number of characteristics, based on a number of weightings received in a number of entity inputs for each characteristic, such that each weighting in the number of weightings comprises a multiplicative factor applied to a value of a particular characteristic in the number of characteristics;
adjust the second number of values for the number of characteristics based on the number of weightings received in the number of entity inputs for the each characteristic; and
select a desired route based on:
the first number of values for the number of characteristics; and
the second number of values for the number of characteristics.

10. The apparatus of claim 9, wherein the route modeler is further configured to select the desired route from one of the selected route and the new route based on the first number of values for the number of characteristics and the second number of values for the number of characteristics.

11. The apparatus of claim 9, wherein the route modeler is further configured to identify additional information for the performance of the aircraft for a number of additional routes in addition to the new route; identify an additional number of values for the number of characteristics about the number of additional routes based on the additional information; and select the desired route from the selected route, the new route, and the number of additional routes based on the first number of values for the number of characteristics, the second number of values for the number of characteristics, and the additional number of values for the number of characteristics.

12. The apparatus of claim 9, wherein the first number of values for the number of characteristics are adjusted based on a plurality of numbers of weightings for a plurality of entities for each characteristic and the second number of values for the number of characteristics are adjusted based on the plurality of numbers of weightings for the plurality of entities for the each characteristic.

13. The apparatus of claim 9, wherein the route modeler is further configured to identify additional information for the performance of at least one of a number of different types of aircraft or a number of different routes; identify an additional number of values for the number of characteristics about the at least one of the number of different types of aircraft or the number of different routes based on the additional information; and select the desired route from the selected route and a number of additional routes based on the first number of values for the number of characteristics and the additional number of values for the number of characteristics.

14. The apparatus of claim 9, wherein the aircraft is a first type of aircraft, and wherein the second information is identified for a performance of a second type of aircraft for the selected route.

15. A method for processing routes, the method comprising a route modeler in processor unit:
identifying an area of land and a population affected by a number of routes, for a number of aircraft; and
receiving a number of entity inputs that identify a number of weightings for a number of a number of characteristics that comprise a number of environmental characteristics and a number of economic characteristics, that affect the area of land and the population for the number of routes for the number of aircraft, such that each weighting in the number of weightings comprises a multiplicative factor applied to a particular characteristic in the number of characteristics, and the number of environmental characteristics comprises at least two of: an amount of noise produced, a count of population affected, an amount of impact to local air quality of an area of interest, and airport environmental regulations;
generating a number of new routes, for the number of aircraft, for the area of land and population, based on receiving the entity inputs, about the number of routes, associated with the area of land and the population;

identifying values for: characteristics, in the number of characteristics, for each new route in the number of new routes; and each route in the number of routes based on the number of entity inputs; and generating a performance value for the each new route, and for the each route, based on the values, and the number of weightings, for the number of characteristics.

16. The method of claim 15, further comprising:

filtering the number of new routes based on the performance value for the each new route.

17. The method of claim 15, further comprising:

determining an efficiency of the each new route based on a difference between the performance value for the each new route and the performance value for each respective route.

18. The method of claim 15, further comprising, the route modeler using the number of entity inputs such that each entity input identifies one of a plurality of numbers of weightings for the number of characteristics, and wherein computing the performance value for the each new route and for the each route is based on the values and the plurality of numbers of weightings for the number of characteristics.

19. An apparatus comprising a route modeler in a processor unit configured to:

identify an area of land and a population affected by a number of routes, for a number of aircraft; and receive from a number of entity inputs, a number of values, and a number of weightings, for a number of characteristics, for the number of routes for the number of aircraft, such that the number of characteristics comprises at least two of: an amount of noise produced, a count of population affected, an amount of impact to local air quality of an area of interest, and airport environmental regulations, and such that each weighting in the number of weightings comprises a multiplicative factor applied to a particular characteristic in the number of characteristics; and generate performance values, that represent an affect on the land and the population by a performance of the number of aircraft on the number of routes, based upon weightings for the number of characteristics.

20. The apparatus of claim 19, wherein the route modeler is further configured to generate a number of new routes for the number of aircraft.

21. The apparatus of claim 19, wherein the performance values are values representing a performance of an aircraft in the number of aircraft on a route in the number of routes taking into account the weightings for the number of characteristics for the aircraft.

22. The apparatus of claim 20, wherein a desired route is selected based on a comparison of the performance values for the number of new routes and the number of routes.

23. The apparatus of claim 20, wherein a desired aircraft is selected from the number of aircraft based on a comparison of the performance values for the number of new routes and the number of routes.

24. The apparatus of claim 20, wherein a change in a design of the number of aircraft is identified based on a comparison of the performance values for the number of new routes and the number of routes.

25. The apparatus of claim 20, wherein a weighting in the number of weightings for a characteristic in the number of characteristics identifies an importance of the characteristic relative to another characteristic in the number of characteristics.

26. The apparatus of claim 25, wherein a higher value for the weighting in the number of weightings for the characteristic corresponds to a higher importance of the characteristic relative to another characteristic in the number of characteristics with a lower value.

* * * * *